(12) United States Patent
Zhao et al.

(10) Patent No.: US 12,203,203 B2
(45) Date of Patent: Jan. 21, 2025

(54) LAUNDRY LIFTING DEVICE FOR WASHING MACHINE AND DRUM WASHING MACHINE

(71) Applicants: QINGDAO HAIER DRUM WASHING MACHINE CO., LTD., Shandong (CN); HAIER SMART HOME CO., LTD., Shandong (CN)

(72) Inventors: Zhiqiang Zhao, Shandong (CN); Sheng Xu, Shandong (CN); Peishi Lv, Shandong (CN); Yimin Li, Shandong (CN)

(73) Assignees: QINGDAO HAIER DRUM WASHING MACHINE CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 290 days.

(21) Appl. No.: 17/774,185

(22) PCT Filed: Nov. 6, 2020

(86) PCT No.: PCT/CN2020/126967
§ 371 (c)(1),
(2) Date: May 4, 2022

(87) PCT Pub. No.: WO2021/088952
PCT Pub. Date: May 14, 2021

(65) Prior Publication Data
US 2022/0389634 A1 Dec. 8, 2022

(30) Foreign Application Priority Data

Nov. 7, 2019 (CN) .......................... 201911080846.X
Nov. 7, 2019 (CN) .......................... 201911080848.9
(Continued)

(51) Int. Cl.
*D06F 37/06* (2006.01)
*D06F 23/02* (2006.01)
(Continued)

(52) U.S. Cl.
CPC .............. *D06F 37/06* (2013.01); *D06F 23/02* (2013.01); *D06F 37/10* (2013.01); *D06F 39/083* (2013.01)

(58) Field of Classification Search
CPC .......... D06F 23/02; D06F 37/06; D06F 37/10; D06F 39/083
See application file for complete search history.

(56) References Cited

U.S. PATENT DOCUMENTS 2,748,788 A * 6/1956 Duckstein ............. F16K 17/363
137/527
3,239,071 A * 3/1966 Sormanni ............... A47K 10/10
211/119.15
(Continued)

FOREIGN PATENT DOCUMENTS

CN 1740610 A 3/2006
CN 102953257 A 3/2013
(Continued)

OTHER PUBLICATIONS

Electronic translation of WO 2019/165922 to Liu et al. (Year: 2019).*
(Continued)

*Primary Examiner* — Joseph L. Perrin
(74) *Attorney, Agent, or Firm* — BUCHANAN, INGERSOLL & ROONEY PC

(57) ABSTRACT

A laundry lifting device for a washing machine includes a body with an accommodating chamber, a water inlet arranged in the body and communicated with the accommodating chamber, and a centrifugal drainage assembly
(Continued)

arranged in the accommodating chamber. The centrifugal drainage assembly includes a sealing plunger capable of doing reciprocating motion and an elastic piece for elastically resetting the sealing plunger, the body is provided with a plunger base for installing the sealing plunger, and the elastic piece is kept limited in the plunger base in the reciprocating motion process of the sealing plunger. The elastic piece is installed in the plunger base in the sealing mode, and the elastic piece is kept limited in the plunger base in the reciprocating motion of the sealing plunger. So thread scraps are prevented from being hung on the elastic piece.

20 Claims, 14 Drawing Sheets

(30) Foreign Application Priority Data

Nov. 7, 2019 (CN) .................. 201911080856.3
Nov. 7, 2019 (CN) .................. 201911080858.2

(51) Int. Cl.
*D06F 37/10* (2006.01)
*D06F 39/08* (2006.01)

(56) References Cited

U.S. PATENT DOCUMENTS

| | | | |
|---|---|---|---|
| 9,574,296 | B2 | 2/2017 | Kim |
| 2009/0255591 | A1 | 10/2009 | Grout et al. |
| 2011/0005277 | A1* | 1/2011 | Hasanreisoglu ...... D06F 37/225 |
| | | | 68/12.06 |
| 2013/0036774 | A1 | 2/2013 | Kim et al. |
| 2020/0399814 | A1* | 12/2020 | Li .................. D06F 23/025 |
| 2021/0054557 | A1* | 2/2021 | Li .................. D06F 23/00 |
| 2023/0050131 | A1 | 2/2023 | Zhao et al. |

FOREIGN PATENT DOCUMENTS

| | | | | |
|---|---|---|---|---|
| CN | 104005201 | A | 8/2014 | |
| CN | 204226763 | U | 3/2015 | |
| CN | 104727077 | A | 6/2015 | |
| CN | 106120235 | A | 11/2016 | |
| CN | 205856868 | U | 1/2017 | |
| CN | 106436194 | A | 2/2017 | |
| CN | 107523969 | A | 12/2017 | |
| CN | 207812119 | U | 9/2018 | |
| CN | 108796962 | A | 11/2018 | |
| CN | 109402952 | A | 3/2019 | |
| CN | 109423800 | A | 3/2019 | |
| CN | 109423801 | A | 3/2019 | |
| CN | 109423815 | A | 3/2019 | |
| CN | 109423817 | A | 3/2019 | |
| CN | 109423853 | A | 3/2019 | |
| CN | 109423854 | A | 3/2019 | |
| CN | 209307659 | U | 8/2019 | |
| CN | 110195315 | A | 9/2019 | |
| CN | 110195331 | A | 9/2019 | |
| CN | 110195333 | A | 9/2019 | |
| CN | 112011963 | A | 12/2020 | |
| EP | 3623512 | A1 | 3/2020 | |
| EP | 3677716 | A1 * | 7/2020 | ............. D06F 23/02 |
| GB | 2364716 | A | 2/2002 | |
| WO | WO-2019165922 | A1 * | 9/2019 | |
| WO | 2021139519 | A1 | 7/2021 | |

OTHER PUBLICATIONS

Electronic translation of CN 109423800 to Li et al. (Year: 2019).*
International Search Report (PCT/ISA/210) with English translation and Written Opinion (PCT/ISA/237) mailed on Jan. 13, 2021, by the Chinese Patent Office as the International Searching Authority for International Application No. PCT/CN2020/126967.
Extended European Search Report issued on Nov. 24, 2022, in corresponding European Patent Application No. 20884819.2. (7 pages).

* cited by examiner

LAUNDRY LIFTING DEVICE FOR WASHING MACHINE AND DRUM WASHING MACHINE

TECHNICAL FIELD

The disclosure relates to the technical field of laundry apparatus, in particular to a laundry lifting device for a washing machine and a drum washing machine.

BACKGROUND

As a most widely used household appliance in daily life of people, the washing machine helps people get rid of the trouble of washing laundry and brings great convenience to people. However, there are certain defects about the washing machine such as long time consumption and large water consumption. Along with social development, water resources as important natural resources become more and more important. The water-saving awareness of people is improved, so it is particularly important how to realize the water-saving function of the washing machine.

In order to improve the water-saving of the washing machine, some patents, such as a Chinese disclosure patent with the application No. 201410215346.3 titled as a drum washing machine, are provided. The disclosure relates to a drum washing machine which includes a box body, an inner drum and an outer drum arranged in the box body, and a door seal arranged between the outer drum and the box body. The inner drum is connected with a driving device. The inner drum is a hole-free inner drum, the inner drum is a conical drum with a small diameter at the drum bottom and a large diameter at the drum opening, the drum opening of the inner drum is curved inwards. A water inlet guide pipe is arranged on the door seal, one end of the water inlet guide pipe is connected with a heating device for heating rapidly washing water, and the other end of the water inlet guide pipe penetrates through the door seal and extends into the inner drum. A water outlet and a water pressure detection device are arranged on the outer drum. According to the technical solution, the inner drum is a hole-free inner drum, water feeding of the inner drum is achieved through the water inlet guide pipe arranged on the door seal. Water is drained in the dewatering process through the shape of the inner drum. Therefore there is no water being stored between the inner drum and the outer drum, and the washing water consumption is greatly reduced.

According to the drum washing machine with the hole-free inner drum, feeding water in the drum washing machine is achieved through the door seal. The door seal is mainly used for sealing a drum opening of the outer drum of the washing machine, and the sealing effect of the door seal is easily affected and is not easy to achieve due to the fact that the water inlet guide pipe is arranged on the door seal. Besides, drainage is mainly achieved through combination of a drum-shaped structure and high-speed driving of a driving device, the drum-shaped structure is complex, the drainage effect and the sealing effect of the inner drum cannot be guaranteed, and many problems exist in practical application.

In view of this, the disclosure is proposed.

SUMMARY

In order to solve the problem, a first objective of the disclosure is to provide the laundry lifting device for the washing machine, and specifically, the following technical solution is adopted.

A laundry lifting device for a washing machine includes:
a body, which is internally provided with an accommodating chamber;
a water inlet, which is arranged in the body and communicated with the accommodating chamber; and
a centrifugal drainage assembly, which is arranged in the accommodating chamber, wherein the initial state of the centrifugal drainage assembly is a closed state, and the centrifugal drainage assembly is opened for drainage under the action of centrifugal force; and
the centrifugal drainage assembly includes a sealing plunger capable of doing reciprocating motion and an elastic piece used for elastically resetting the sealing plunger, the body is provided with a plunger base used for installing the sealing plunger, and the elastic piece is kept limited in the plunger base in the reciprocating motion of the sealing plunger.

Furthermore, the body includes:
a lifting shell, which is internally provided with an open cavity; and
a lifting base body, which is detachably installed at an open end of the open cavity of the lifting shell to form the accommodating chamber;
the plunger base is arranged on the lifting base body, the lifting base body is provided with a plunger hole used for allowing the sealing plunger to penetrate out of the accommodating chamber, a plunger channel is formed in the plunger base, the sealing plunger is arranged in the plunger channel and capable of doing reciprocating motion, and the elastic piece is kept limited in the plunger channel in the reciprocating motion of the sealing plunger.

Furthermore, the plunger base includes a hollow column penetrating through the plunger hole and a support arranged at one end, arranged outside the accommodating chamber, of the hollow column, and the plunger channel is through the hollow column.

Furthermore, the sealing plunger includes a sealing column and a sealing plug arranged at one end of the sealing column. The elastic piece is a spring, one end of the spring abuts against an inner wall of the plunger channel, and the other end of the spring abuts against the sealing column. A certain interval is formed between the position, abutting against the spring, of the sealing column and the sealing plug. The interval is larger than or equal to the displacement distance of the sealing plug moving from the closed state to the drainage state.

Furthermore, the sealing column includes a guide part and an installation part located at one end of the guide part. The guide part is installed in the plunger channel and capable of doing the reciprocating motion. The sealing plug is installed on the installation part. The support is of an annular structure internally provided with a hollow channel communicating with the plunger channel. The height of a projection of the installation part on a reciprocating motion path is larger than or equal to the height of a projection of the support on the reciprocating motion path.

Furthermore, the guide part is a first column body with cylindrical shape, and the installation part is a second column body with cylindrical shape located at one end of the first column body. The diameter of the first column body is smaller than the diameter of the second column body. The spring abuts against the end face of the second column body.

A laundry lifting device for a washing machine, including:
a body, which is internally provided with an accommodating chamber;

a water inlet, which is arranged in the body and communicated with the accommodating chamber; and a centrifugal drainage assembly, which is arranged in the accommodating chamber, wherein the initial state of the centrifugal drainage assembly is a closed state, and the centrifugal drainage assembly is opened for drainage under the action of centrifugal force; and the centrifugal drainage assembly includes a sealing plunger capable of doing reciprocating motion and an elastic piece used for elastically resetting the sealing plunger, the body is provided with a plunger base used for installing the sealing plunger, and the elastic piece is kept limited in the plunger base in the reciprocating motion of the sealing plunger.

Furthermore, the body includes:

a lifting shell, which is internally provided with an open cavity; and a lifting base body, which is detachably installed at an open end of the open cavity of the lifting shell to form the accommodating chamber;

the plunger base is arranged on the lifting base body, the lifting base body is provided with a plunger hole used for allowing the sealing plunger to penetrate out of the accommodating chamber, a plunger channel is formed in the plunger base, the sealing plunger is arranged in the plunger channel and capable of doing the reciprocating motion, and the elastic piece is kept limited in the plunger channel in the reciprocating motion of the sealing plunger.

Furthermore, the plunger base includes a hollow column penetrating through the plunger hole and a support arranged at one end, arranged outside the accommodating chamber, of the hollow column. The plunger channel is through the hollow column.

Furthermore, the sealing plunger includes a sealing column and a sealing plug arranged at one end of the sealing column. The elastic piece is a spring, one end of the spring abuts against the inner wall of the plunger channel, and the other end of the spring abuts against the sealing column. A certain interval is formed between the position, abutting against the spring, of the sealing column and the sealing plug. The interval is larger than or equal to the displacement distance of the sealing plug moving from the closed state to the drainage state.

Furthermore, the sealing column includes a guide part and an installation part located at one end of the guide part. The guide part is installed in the plunger channel and capable of doing a reciprocating motion. The sealing plug is installed on the installation part. The support is of an annular structure internally provided with a hollow channel communicating with the plunger channel. The height of a projection of the installation part on a reciprocating motion path is larger than or equal to the height of a projection of the support on the reciprocating motion path.

Furthermore, the guide part is a first column body with cylindrical shape, and the installation part is a second column body with cylindrical shape located at one end of the first column body. The diameter of the first column body is smaller than that of the second column body, and the spring abuts against the end face of the second column body.

A laundry lifting device for a washing machine, including:

a body, which is internally provided with an accommodating chamber;

a water inlet, which is arranged in the body and communicates with the accommodating chamber; and a centrifugal drainage assembly, which is arranged in the accommodating chamber, wherein the initial state of the centrifugal drainage assembly is a closed state, and the centrifugal drainage assembly is opened for drainage under the action of centrifugal force; and the centrifugal drainage assembly includes a sealing plunger capable of doing reciprocating motion and an elastic piece used for elastically resetting the sealing plunger, and an elastic piece sheath is arranged on the elastic piece and wraps the elastic piece in a sealing mode.

Furthermore, the body includes:

a lifting shell, which is internally provided with an open cavity;

a lifting base body, which is detachably installed at an open end of the open cavity of the lifting shell to form the accommodating chamber; and a plunger base, which is arranged on the lifting base body, the lifting base body is provided with a plunger hole used for allowing the sealing plunger to penetrate out of the accommodating chamber, a plunger channel is formed in the plunger base, the sealing plunger is arranged in the plunger channel and capable of doing in a reciprocating motion; the elastic piece and the elastic piece sheath are both arranged in the plunger channel. Alternatively one end of the elastic piece sheath is connected to the periphery of an outlet of the plunger channel in a sealing mode, and the other end of the elastic piece sheath is connected to the portion, being out of the plunger channel, of the sealing plunger in a sealing mode.

Furthermore, the sealing plunger includes a sealing column and a sealing plug arranged at one end of the sealing column. The elastic piece is a spring, one end of the spring abuts against the inner wall of the plunger channel, and the other end of the spring abuts against the sealing column. The elastic piece sheath is an elastic threaded pipe.

The elastic threaded pipe is arranged in the plunger channel and arranged outside the spring in a sleeving mode to wrap the whole spring. Or one end of the elastic threaded pipe is arranged on the periphery of an outlet of the plunger channel in a sealing mode, and the other end of the elastic threaded pipe is arranged on the sealing plug in a sealing mode.

Furthermore, the sealing plug includes a sealing part fixed at one end of the sealing column. The elastic piece sheath is integrated with the sealing part and configured to extend from the sealing part to the other end of the sealing column to form the elastic threaded pipe.

Furthermore, the end, located in the plunger channel, of the elastic threaded pipe is in sealing contact with the inner wall face of the plunger channel under the elastic action of the elastic piece.

Furthermore, the plunger base includes a hollow column penetrating through the plunger hole and a support arranged at the end, located outside the accommodating chamber, of the hollow column. The plunger channel is through the hollow column.

A laundry lifting device for a washing machine, including:

a body, which is internally provided with an accommodating chamber;

a water inlet, which is arranged in the body and communicated with the accommodating chamber; and a centrifugal drainage assembly, which is arranged in the accommodating chamber, wherein the initial state of the centrifugal drainage assembly is a closed state, and the centrifugal drainage assembly is opened for drainage under the action of centrifugal force; and the centrifugal drainage assembly includes a sealing plunger capable of doing reciprocating motion and an elastic piece used for elastically resetting the sealing plunger, the body is provided with a plunger base used for installing the sealing plunger, and the plunger base includes a blocking body used for blocking the elastic piece in the reciprocating motion of the sealing plunger.

Furthermore, the body includes:

a lifting shell, which is internally provided with an open cavity; and a lifting base body, which is detachably installed at an open end of the open cavity of the lifting shell to form the accommodating chamber;

the plunger base is arranged on the lifting base body, the lifting base body is provided with a plunger hole used for allowing the sealing plunger to penetrate out of the accommodating chamber, a plunger channel is arranged in the plunger base, the sealing plunger is arranged in the plunger channel and capable of doing a reciprocating motion mode, and the blocking body is an annular baffle arranged on the periphery of an outlet of the plunger channel.

Furthermore, the plunger base includes a hollow column penetrating through the plunger hole and a support arranged at the end, arranged outside the accommodating chamber, of the hollow column. The plunger channel is through the hollow column. The support is of an annular structure internally provided with a hollow channel communicating with the plunger channel. The annular baffle is arranged in the hollow channel of the support.

Furthermore, the sealing plunger includes a sealing column and a sealing plug arranged at one end of the sealing column. The elastic piece is a spring, one end of the spring abuts against the inner wall of the plunger channel, and the other end of the spring abuts against the sealing column/the sealing plug.

In a drainage state, the sealing plug is retracted into the annular baffle. In a closed state, the sealing plug is extended out of the annular baffle, and the spring is blocked by the annular baffle.

Furthermore, the height of a projection of the annular baffle on the reciprocating motion path is smaller than that of a projection of the support on the reciprocating motion path. The height of a projection of the sealing plug on the reciprocating motion path is larger than the height difference of projections of the support and the annular baffle on the reciprocating motion path.

Furthermore, the sealing column includes a guide part and an installation part located at one end of the guide part, and the sealing plug is installed on the installation part.

The guide part can be installed in the plunger channel and capable of doing a reciprocating motion. An annular convex is arranged at the end, close to the guide part, of the installation part. One end of the spring abuts against the end face of the annular convex, and the annular convex ring is kept in the annular baffle in a closed state.

A laundry lifting device for a washing machine, including:

a body, which is internally provided with an accommodating chamber;

a water inlet, which is arranged in the body and communicated with the accommodating chamber; and a centrifugal drainage assembly, which is arranged in the accommodating chamber, wherein the initial state of the centrifugal drainage assembly is a closed state, and the centrifugal drainage assembly is opened for drainage under the action of centrifugal force; and the centrifugal drainage assembly includes a sealing plunger capable of doing reciprocating motion and an elastic piece used for elastically resetting the sealing plunger, the body is provided with a plunger base used for installing the sealing plunger, the sealing plunger is provided with a sealing part, the plunger base is provided with a sleeve part, the sealing part is slidable arranged in the sleeve part in a sealing mode, and the elastic piece is arranged in the sealing sleeve in a sealing mode through the sealing part.

Furthermore, the sealing plunger includes a sealing column and a sealing plug. The sealing column includes a guide column section, and the sealing part is a sealing column section arranged at one end of the guide column. The sealing plug is arranged at the end of the sealing column section. The sleeve part includes a guide sleeve and a sealing sleeve. The guide column section is arranged in the guide sleeve and capable of doing a reciprocating motion mode. The sealing column section is slidable arranged in the sealing sleeve in a sealing mode. The elastic piece is arranged in the guide sleeve, one end of the elastic piece abuts against the guide sleeve, and the other end of the elastic piece abuts against the guide column section or the sealing column section.

Furthermore, the guide sleeve and the sealing sleeve are both cylindrical and have the same inner diameter. The guide column section and the sealing column section are both cylindrical. The outer diameter of the guide column section is smaller than a diameter of the sealing column section. The outer diameter of the sealing column section is equal to or slightly smaller than the inner diameter of the sealing sleeve.

Preferably, the guide sleeve and the sealing sleeve are integrally formed, and the guide column section and the sealing column section are integrally formed.

Furthermore, the body includes a lifting shell, which is internally provided with an open cavity; and a lifting base body, which is detachably installed at an open end of the open cavity of the lifting shell to form the accommodating chamber. The plunger base is arranged on the lifting base body. The lifting base body is provided with a plunger hole used for allowing the sealing plunger to penetrate out of the accommodating chamber. The sleeve part of the plunger base penetrates through the plunger hole. The plunger base further includes a support which is arranged at one end, arranged outside the accommodating chamber, of the sleeve part. The sealing sleeve is configured to extend out of the accommodating chamber. The height of a projection of the sealing sleeve on the reciprocating motion path is smaller than or equal to the height of a projection of the support on the reciprocating motion path.

Furthermore, the support is of an annular structure arranged around the periphery of the sealing sleeve in a sleeving mode. The axial length of the portion, located outside the accommodating chamber, of the sealing sleeve is smaller than the axial length of the support.

Furthermore, an installation column is arranged at the end of the sealing column section. A limiting protruding ring is arranged on the installation column The sealing plug is provided with a limiting groove with an opening, and the limiting protruding ring is installed in the limiting groove in a limited mode.

The centrifugal drainage assembly of the disclosure includes a centrifugal piece which generates centrifugal motion under the action of centrifugal force. The centrifugal piece includes a connecting part and a balance weight part. One end of the connecting part is connected with the balance weight part, the other end of the connecting part is rotatably connected with the sealing plunger, and the middle of the connecting part is rotatably mounted on the plunger base to form a lever structure.

Furthermore, the connecting part is a connecting rod, and the balance weight part is a balance weight block. The hollow column is provided with an extending part extending towards the balance weight part, and the middle of the connecting rod is rotatably connected with the extending part through a rotating shaft.

The second objective of the disclosure is to provide a drum washing machine with the above-mentioned laundry lifting device.

A drum washing machine with the laundry lifting device for the washing machine, includes:
an inner drum; and
an inner drum door, which is installed on an drum opening of the inner drum in an opened/closed mode; wherein when the inner drum door is closed, the inner drum door and the inner drum jointly form an independent washing chamber for accommodating washing water when laundry are washed.

A water outlet is formed in the side wall of the inner drum, the lifting device is installed on the water outlet in the inner wall of the inner drum, and the centrifugal water drainage assembly blocks and closes the water outlet.

Furthermore, a fixing hole used for fixedly assembling the lifting device is arranged in the position, close to the water outlet, of the side wall of the inner drum, and the lifting device is fixed to the fixing hole in a sealing mode through a connecting piece.

The laundry lifting device of the disclosure can be installed on the inner wall of the inner drum of the drum washing machine. In the laundry washing process, laundry is lifted to a certain height along with rotation of the inner drum to be fallen down. The centrifugal drainage assembly is integrally arranged in the laundry lifting device. The initial state of the centrifugal drainage assembly is the closed state, and the inner drum is kept closed for accommodating washing water. The centrifugal drainage assembly can be opened for drainage under the action of centrifugal force, so that drainage of the drum washing machine with the hole-free inner drum is achieved.

According to the drum washing machine, the inner drum door is installed on the drum opening of the inner drum, the hole-free drum design is adopted in the inner drum, the inner drum door and the inner drum jointly form the independent washing chamber. Washing water is contained when laundry are washed. There is no water in washing/rinsing process between the inner drum and the outer drum, so the washing water consumption of the washing machine is greatly reduced; the possibility of dirt adhesion between the inner drum and the outer drum is avoided; the user health and the user experience are greatly improved, and water resources are greatly saved.

According to the disclosure, the elastic piece of the centrifugal drainage assembly is installed in the plunger base in the sealing mode. The elastic piece is kept limited in the plunger base in the reciprocating motion of the sealing plunger. Sealing arrangement of the elastic piece is achieved, thread scraps are prevented from being hung, and the working stability of the centrifugal drainage assembly is ensured.

DETAILED DESCRIPTION

Figure 1:
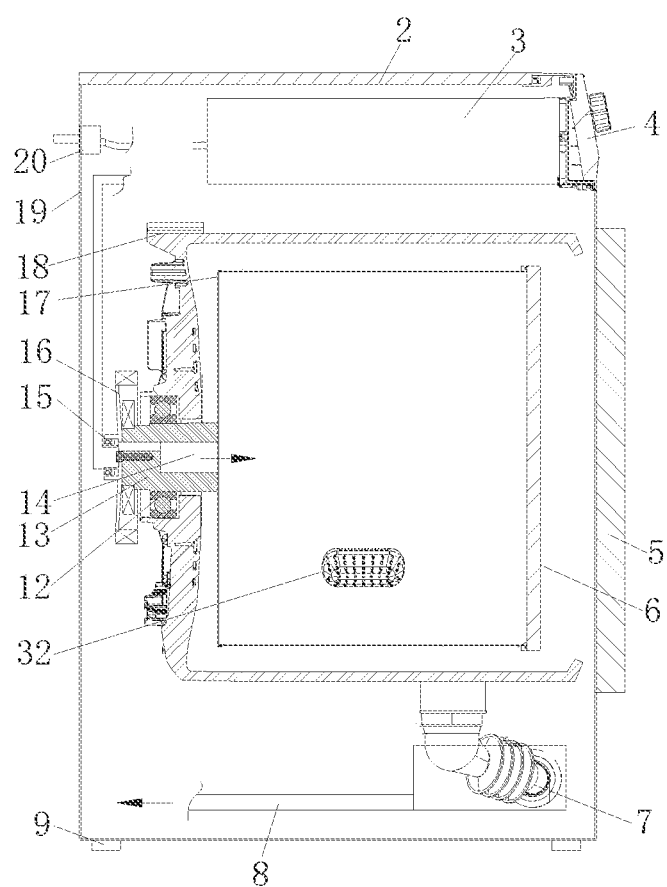
FIG. 1 is a principle schematic diagram of the drum washing machine in the embodiment I of the disclosure.
Figure 2:
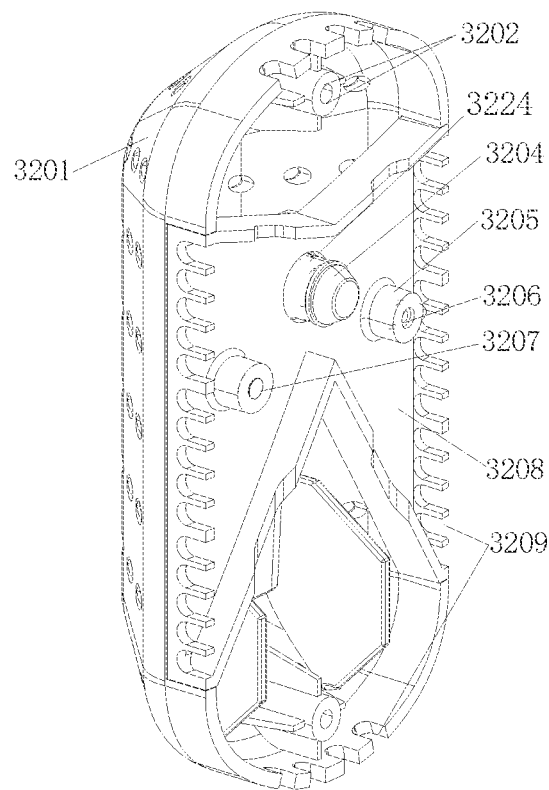
FIG. 2 is a first stereoscopic schematic diagram of the laundry lifting device for the washing machine in the embodiment I of the disclosure.
Figure 3:
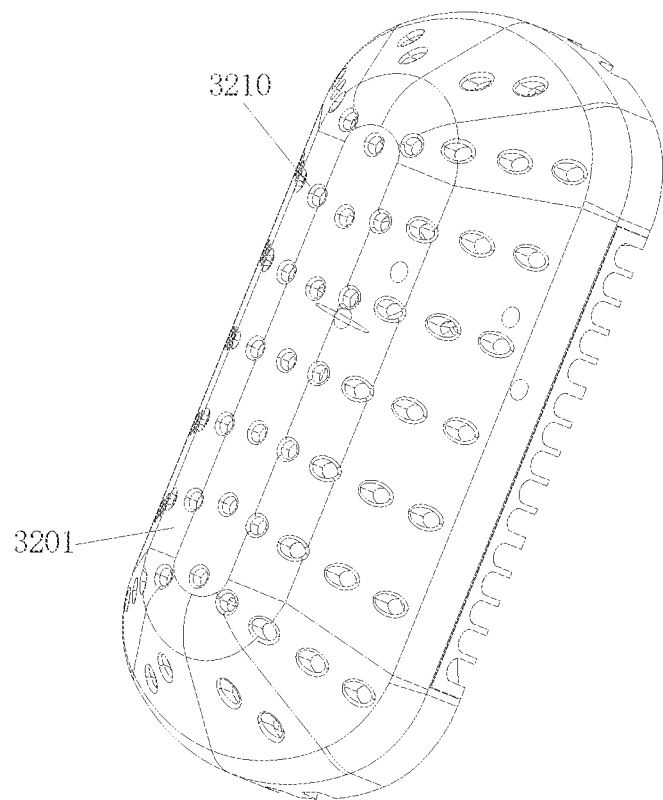
FIG. 3 is a second stereoscopic schematic diagram of the laundry lifting device for the washing machine in the embodiment I of the disclosure.
Figure 4:
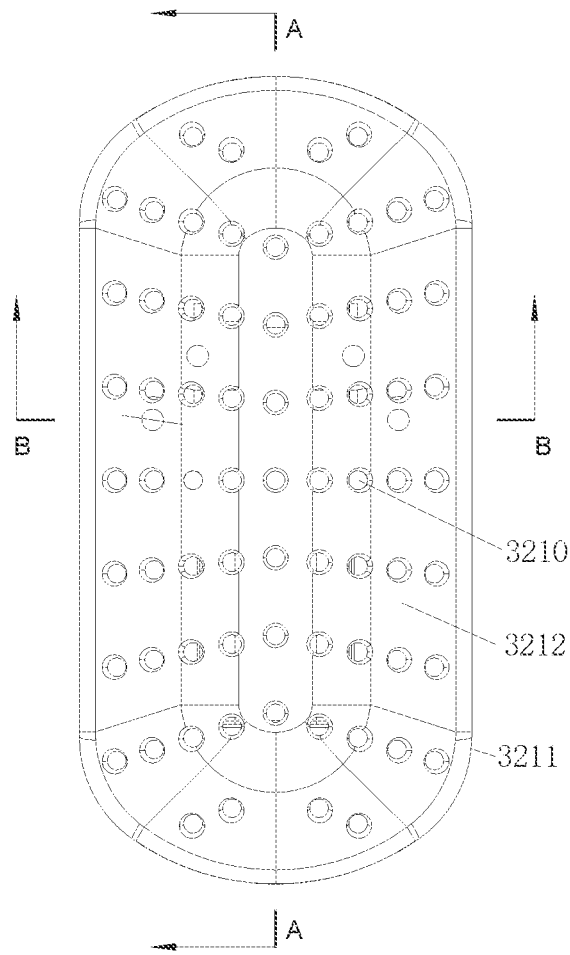
FIG. 4 is a front view of the laundry lifting device for the washing machine in the embodiment I of the disclosure.
Figure 5:
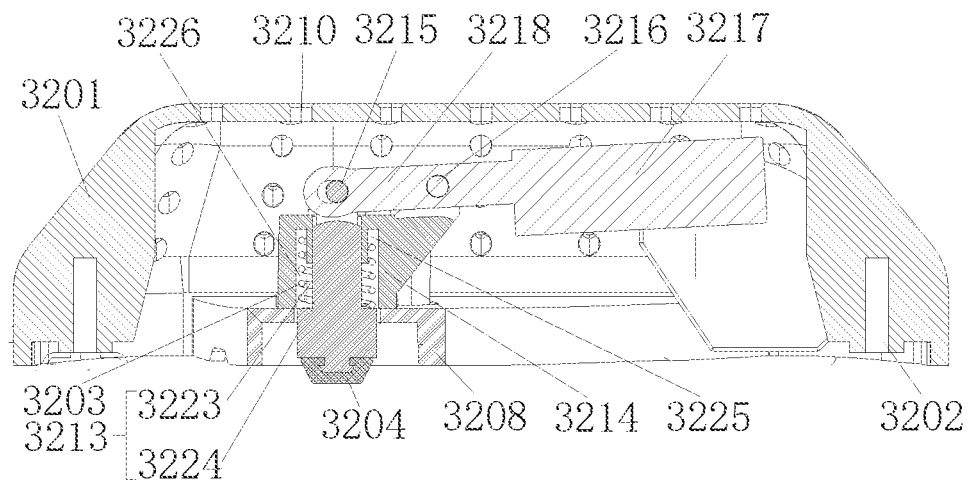
FIG. 5 is a section view of the laundry lifting device for the washing machine in the embodiment I of the disclosure along the A-A plane in FIG. 4.

The laundry lifting device for the washing machine and the drum washing machine are described in detail according to the following drawings.

As shown in FIG. 1-FIG. 18, the drum washing machine with the hole-free inner drum and in the front-open structure is simple in structure, and there is no washing/rinsing water between the inner drum and the outer drum, so that the washing water consumption of the washing machine is greatly reduced. The possibility of dirt adhesion between the inner drum and the outer drum is avoided. The user's health and the user's experience are greatly improved, and water resources are greatly saved.

The drum washing machine of the embodiment is provided with a shell 19. The shell 19 includes an upper deck plate 2, a front plate, a rear back plate and a bottom plate. Bottom feet 9 are fixedly installed on the bottom plate and used for supporting the whole washing machine. An outer drum 18 is arranged in the shell 19, and an inner drum 17 is coaxially arranged in the outer drum 18. The outer drum 18 is mainly used for collecting drained water of the inner drum 17 and drained water in high-speed centrifugal dewatering of the inner drum 17. The laundry is continuously lifted, dropped and beaten in the rotation of this inner drum 17, preferably, lifting ribs 43 are arranged, so that it is convenient to clean the laundry. The inner drum 17 is of a hole-free structure. The outer drum 18 is provided with a central mounting hole for mounting and fixing a bearing 12. An inner drum shaft 13 fixedly connected with the inner drum 17 penetrates through the bearing 12 and is connected with a driving motor 16. An inner drum door 6 capable of being opened/closed is installed on a drum opening in the front portion of the inner drum 17, and therefore the inner drum 17 is of a sealed cabin structure.

A machine door 5 capable of being opened/closed is installed on the shell 19.

Embodiment I

As shown in FIG. 1-FIG. 6, the embodiment of the disclosure provides the laundry lifting device for the washing machine and the drum washing machine.

The laundry lifting device for the washing machine in the embodiment includes:
- a body, which is internally provided with an accommodating chamber;
- a water inlet, which is arranged in the body and communicated with the accommodating chamber; and
- a centrifugal drainage assembly, which is arranged in the accommodating chamber;
- wherein the initial state of the centrifugal drainage assembly is a closed state, and the centrifugal drainage assembly is opened for drainage under the action of centrifugal force.

The laundry lifting device of the embodiment can be installed on the inner wall of the inner drum of the drum washing machine. In the laundry washing process, the laundry is lifted to a certain height along with rotation of the inner drum and is beaten to fall down. According to the embodiment, the centrifugal drainage assembly is integrated in the laundry lifting device. The initial state of the centrifugal drainage assembly is the closed state, and the inner drum is kept closed to independently contain washing water. The centrifugal drainage assembly can be opened to drain water under the action of centrifugal force, so that water in the drum washing machine with the hole-free inner drum is drained.

Therefore, the centrifugal drainage assembly is arranged in the lifting device, so that the laundry is lifted and water in the drum washing machine with the hole-free inner drum is drained, modular supply is formed, production and assembly are facilitated, and the assembly efficiency is improved.

In the drainage state of the centrifugal drainage assembly, if thread scraps are hung on the elastic piece, the thread scraps are not prone to falling off. Even drainage water flow, centrifugal water flow and centrifugal force cannot make the thread scraps separate from the elastic piece. Furthermore, due to the fact that the thread scraps hung on the elastic piece have a certain length, part of the non-hung parts reach a drainage hole of the inner drum and/or the position close to the sealing plunger under the action of drainage water flow, centrifugal water flow and centrifugal force, so sealing failure is caused.

In order to solve the problem that thread scraps are prone to being hung on the elastic piece, the centrifugal drainage assembly of the embodiment includes a sealing plunger capable of doing reciprocating motion and the elastic piece 3203 used for elastic reset of the sealing plunger. The body is provided with a plunger base used for installing the sealing plunger, and the elastic piece is kept limited in the plunger base in the reciprocating motion process of the sealing plunger. According to the embodiment, the elastic piece of the centrifugal drainage assembly is installed in the plunger base in a sealing mode, and sealing arrangement of the elastic piece is achieved, so thread scraps are prevented from being hung, and the working stability of the centrifugal drainage assembly is guaranteed.

As shown in FIG. 2-FIG. 6, the body in the embodiment includes:
- a lifting shell 3201, which is provided with a protruding part on the surface, and is internally provided with an open cavity; and
- a lifting base body 3208, which is detachably installed at an open end of the open cavity of the lifting shell 3201 to form an accommodating chamber;
- the centrifugal drainage assembly is installed on the lifting base body 3208, and the water inlet 3209 is arranged in the lifting shell 3201 and/or the lifting base body 3208.

The lifting device of the embodiment includes a lifting shell 3201, and the surface of the lifting shell 3201 is provided with a protruding part used for lifting laundry. The lifting base body 3208 is detachably installed at the open end of the open cavity of the lifting shell 3201 to form an accommodating chamber used for installing a centrifugal drainage assembly.

Furthermore, the plunger base of the embodiment is arranged on the lifting base body 3208, the lifting base body 3208 is provided with a plunger hole used for allowing the sealing plunger to penetrate out of the accommodating chamber, and a plunger channel is arranged in the plunger base. The sealing plunger is arranged in the plunger channel in a reciprocating motion mode, and the elastic piece is kept limited in the plunger channel in the reciprocating motion process of the sealing plunger. In addition, the plunger channel of the embodiment ensures that the sealing plunger stably reciprocates, so that the sealing plunger 3213 can be reset more accurately, and the effect on blocking the water outlet of the inner drum is keeping well.

Specifically, the plunger base includes a hollow column 3214 and a support 3208. The hollow column 3214 penetrates through the plunger hole, the support 3208 is arranged at one end, arranged outside the accommodating chamber, of the hollow column 3214, and the plunger channel 3226 is through the hollow column 3214.

The sealing plunger includes a sealing column 3213 and a sealing plug 3204 arranged at one end of the sealing column 3213. The elastic piece 3203 is a spring, one end of the spring abuts against the inner wall of the plunger channel 3226, the other end of the spring abuts against the sealing column 3213, and a certain interval is formed between the position of the sealing column 3213 abutting against the spring and the sealing plug 3204. The interval is larger than or equal to the displacement distance of the sealing plug 3204 moving from the closed state to the drainage state.

According to the embodiment, the mounting positions of the spring and the sealing plug 3204 are limited, so that the spring does not extend out of the plunger channel 3226 when the sealing plug 3204 extends out to block the water outlet, the contact between washing water and the spring is avoided, and thread scraps are prevented from being hung on the spring.

Furthermore, the sealing column 3213 includes a guide part 3223 and an installation part 3224 located at one end of the guide part 3223. The guide part 3223 is installed in the plunger channel 3226 in a reciprocating motion mode, and the sealing plug 3204 is installed on the installation part 3224. The support 3208 is of an annular structure internally provided with a hollow channel communicating with the plunger channel 3226, and the height of a projection of the installation part 3224 on the reciprocating motion path is larger than or equal to the height of a projection of the support 3208 on the reciprocating motion path. Therefore, the spring cannot extend out of the plunger channel 3226 when the sealing plug 3204 extends out of the support 3208 to block the water outlet.

Specifically, the guide part 3223 is a first column body with cylindrical shape, and the installation part 3224 is a second column body with cylindrical shape located at one end of the first column body. The diameter of the first column body is smaller than that of the second column body, and the spring abuts against the end face of the second column body. The other end of the second column body is provided with an installation clamping ring used for assembling the sealing plug 3204, and the sealing plug 3204 is provided with an installation clamping groove matched with the installation clamping ring.

As an implementation mode of the embodiment, a spring installation chamber 3225 used for limiting the other end of the spring is formed in the end of the accommodating chamber for accommodating the sealing column 3213.

Furthermore, the centrifugal drainage assembly of the embodiment includes a centrifugal piece which generates centrifugal motion under the action of centrifugal force. The centrifugal piece includes a connecting part 3218 and a balance weight part 3217, one end of the connecting part 3218 is connected with the balance weight part 3217, the other end of the connecting part 3218 is rotatably connected with the sealing plunger 3213, and the middle of the connecting part 3218 is rotatably installed on the plunger base to form a lever structure.

One end of the connecting part 3218 is provided with a first connecting hole 3215 which is rotatably connected with the end of the sealing plunger 3213, and the middle of the connecting part 3218 is provided with a second connecting hole 3216.

In order to fixedly connect the lifting shell 3201 with the lifting base body 3208, the lifting base body 3208 is provided with a base body fixing column 3205, a connecting rib 3219 extending towards the open end is arranged in the open cavity of the lifting body 3201, and the base body fixing column 3205 is fixedly connected with the connecting rib 3219.

Preferably, the centrifugal drainage assembly is arranged in the middle of the lifting base body 3208, and at least two base body fixing columns 3205 are symmetrically arranged on the two sides of the centrifugal drainage assembly.

Furthermore, the base body fixing column 3205 and the connecting rib 3219 are clamped and positioned through a clamping structure, and the base body fixing column 3205 and the connecting rib 3219 are fixedly connected through a connecting piece 3207 after being positioned.

Preferably, the connecting rib 3219 is provided with a clamping protrusion, the base body fixing column 3205 is provided with a channel for allowing the connecting rib to stretch in. The peripheral wall of the channel is provided with a clamping groove engaging with the clamping protrusion in a clamped mode.

The connecting rib 3219 is provided with a connecting hole, the base body fixing column 3205 is provided with a positioning hole corresponding to the connecting hole, the connecting piece 3207 penetrates through the positioning hole to be fixedly connected with the connecting hole. Preferably, the connecting piece 3207 is a connecting screw.

In order to install the lifting device in the inner drum, shell fixing columns 3202 used for fixedly assembling the lifting device are arranged at two ends of an opening of the lifting shell 3201 respectively, and the positions, corresponding to the shell fixing columns 3202, of the lifting base body 3208 are arranged in an avoiding mode. The lifting device is installed in the inner drum by shell fixing columns 3202 without changing the structure of the lifting device. The learning cost of assembly is reduced, and the assembly efficiency is improved.

Preferably, the lifting base body 3208 is of a plate-shaped structure which covers the open cavity of the lifting shell 3201 in a sealing mode, a certain interval is formed between each of the two ends of the plate-shaped structure and the edge of the opening of the lifting shell, and the shell fixing columns 3202 are correspondingly arranged in the intervals at the two ends.

The lifting shell 3201 of the embodiment includes an annular base part 3211 and a protruding part 3212, wherein the protruding part 3212 and the annular base part 3211 are integrally formed, and the protruding part 3212 protrudes and extends towards one side.

The water inlet 3209 is formed in the annular base part 3211, and a plurality of spraying holes 3210 communicating with the open cavity are formed in the protruding part 3212.

As shown in FIG. 1, the embodiment of the disclosure also provides a drum washing machine with the laundry lifting device for the washing machine, which includes:

an inner drum 17; and an inner drum door 6 installed on a drum opening of the inner drum 17 in an opened/closed mode;

the inner drum door 6 and the inner drum 17 jointly form an independent washing chamber when the inner drum door 6 is closed, and washing water is contained in the independent washing chamber when laundry are washed; and a water outlet is formed in the side wall of the inner drum 17, the lifting device 32 is installed on the water outlet in the inner wall of the inner drum 17, and the centrifugal water drainage assembly blocks and closes the water outlet.

According to the drum washing machine of the embodiment, the inner drum door 6 is installed on the drum opening of the inner drum 17, the inner drum 17 is free of holes, and the inner drum door 6 and the inner drum 17 jointly form the independent washing chamber. Washing water is contained in the independent washing chamber when laundry is washed, and the space between the inner drum and the outer drum does not need to be filled with washing/rinsing water, so that the washing water consumption of the washing machine is greatly reduced. Thereby the possibility of dirt adhesion between the inner drum and the outer drum is avoided, the user health and the user experience are greatly improved, and water resources are greatly saved.

Furthermore, a fixing hole used for fixedly assembling the lifting device 32 is formed in the side wall of the inner drum 17, the lifting device 32 is fixed to the fixing hole in a sealing mode through a connecting piece, and the inner drum 17 is kept closed through sealed connection. So the purpose of independently containing washing water in the inner drum is achieved.

The washing machine includes an inner drum, washing water is contained in the inner drum when laundry are washed. A drainage hole is formed in the side wall of the inner drum, and a lifting device for controlling the drainage hole to be opened or closed is installed on the drainage hole. The control method of the drum washing machine includes: in the laundry washing process of the washing machine, the rotation speed of the inner drum is controlled to reach or exceed a set rotation speed N0, and the centrifugal drainage assembly of the lifting device make the drainage hole be open under centrifugal force for inner drum drainage.

According to the drainage device, the centrifugal drainage assembly is adopted. The centrifugal drainage assembly is opened to achieve drainage by controlling the inner drum to rotate to generate centrifugal force. Drainage and dehydration of the drum washing machine with the hole-free inner drum are achieved by combining the centrifugal drainage assembly with program control.

As an implementation mode of the embodiment, after the washing machine executes a washing program or a rinsing program, the rotating speed of the inner drum is controlled to reach a first rotating speed N1 and is maintained for a set time t1, wherein N1 is larger than or equal to N0, and N0 is larger than the rotating speed of the inner drum in the washing program or the rinsing program. When the rotating speed N1 of the inner drum is kept and the rotating time reaches t1, the inner drum is controlled to stop rotating and enter the next program.

Preferably, N1 is in a range of 110-400 r/min, more preferably, 170±50 r/min, and further preferably, 150±20 r/min.

Preferably, the range of t1 is between 0.1 and 5 minutes, and more preferably, the range of t1 is between 1 and 2 minutes.

Furthermore, the washing machine includes a weighing device used for weighing the weight in the inner drum. The weighing device detects the weight W0 in the inner drum before the inner drum rotates at N1, the weighing device detects the weight W1 in the inner drum after the rotation time at N1 reaches t1, and the control system judges whether drainage is normal or not according to comparison between W1 and W0.

Furthermore, the control system judges whether drainage is abnormal or not according to the value k of W1/W0, If k is larger than or equal to 0.7, the control system judges that drainage is abnormal and gives an alarm. If not, drainage is normal.

As another implementation mode of the embodiment, after the washing machine executes the washing program or the rinsing program, the rotating speed of the inner drum is controlled to reach the first rotating speed N1, wherein N1 is larger than or equal to N0, and N0 is larger than the rotating speed of the inner drum in the washing program or the rinsing program. After the water in the inner drum is completely drained, the inner drum is controlled to stop rotating to enter the next program.

Furthermore, the washing machine includes a weighing device used for weighing the weight in the inner drum. In the process that the washing machine controls the inner drum to rotate at N1, the control system judges whether drainage is completed or not according to the weight value, detected by the weighing device in real time, in the inner drum.

Furthermore, the method for judging whether drainage is completed or not by the control system according to the weight value, detected by the weighing device in real time, in the inner drum includes:

the weighing device detecting weight values W0, W1, W2, ..., Wt in the inner drum in real time;

the difference between the weighing values at adjacent times being calculated, and n1 being recorded as W1−W0, n2 being recorded as W2−W1, ..., nt being recorded as (Wt)−(Wt−1); and drainage being completed when nt is kept unchanged and tends to 0 within a certain period of time.

Furthermore, the control system judges whether drainage is normal or not by comparing the change conditions of n1, n2, ... and nt. If n1=n2= ... =nt=0, the control system judges that drainage is abnormal and gives an alarm.

Furthermore, the washing machine executes a dewatering program, and the lowest dewatering rotating speed N2 in the dewatering program is larger than or equal to N0.

Embodiment II

As shown in FIG. 1, FIG. 4 and FIG. 6-FIG. 8, the embodiment of the disclosure provides the laundry lifting device for the washing machine and the drum washing machine.

The laundry lifting device for the washing machine includes:

a body, which is internally provided with an accommodating chamber;

a water inlet, which is arranged in the body and communicated with the accommodating chamber; and a centrifugal drainage assembly, which is arranged in the accommodating chamber; wherein the initial state of the centrifugal drainage assembly is a closed state, and the centrifugal drainage assembly is opened for drainage under the action of centrifugal force.

The laundry lifting device of the embodiment can be installed on the inner wall of the inner drum of the drum washing machine. In the laundry washing process, the laundry is lifted to a certain height along with rotation of the inner drum and are beaten to fall down. According to the embodiment, the centrifugal drainage assembly is integrated in the laundry lifting device. The initial state of the centrifugal drainage assembly is the closed state, the inner drum is kept closed to independently contain washing water, and the centrifugal drainage assembly can be opened to drain water under the action of centrifugal force, so that water in the hole-free inner drum of the drum washing machine having is drained out.

Therefore, the centrifugal drainage assembly is arranged in the lifting device, so that the laundry is lifted and water in the drum washing machine with the hole-free inner drum is drained, modular supply is formed, production and assembly are facilitated, and the assembly efficiency is improved.

In the drainage state of the centrifugal drainage assembly, if thread scraps are hung on the elastic piece, the thread scraps are not prone to falling off. Even drainage water flow, centrifugal water flow and centrifugal force cannot make the thread scraps separate from the elastic piece. Furthermore, due to the fact that the thread scraps hung on the elastic piece have a certain length, part of the non-hung parts reach a drainage hole of the inner drum and/or the position close to the sealing plunger under the action of drainage water flow, centrifugal water flow and centrifugal force, so sealing failure is caused.

In order to solve the problem that thread scraps are prone to being hung on the elastic piece, the centrifugal drainage assembly includes a sealing plunger capable of doing reciprocating motion and the elastic piece 3203 used for elastic reset of the sealing plunger. An elastic piece sheath 3227 is arranged on the elastic piece and wraps the elastic piece 3203 in a sealing mode. Thus, in the reciprocating motion process of the centrifugal drainage assembly to be in the closed state and the drainage state, the thread scraps are prevented from being hung on the elastic piece because the elastic piece 3203 is wrapped by the elastic piece sheath 3227 in a sealing mode. And the working stability of the centrifugal drainage assembly is ensured.

As shown in FIG. 4, and FIG. 6-FIG. 8, the body in the embodiment includes:
a lifting shell 3201, which is provided with a protruding part on the surface, and is internally provided with an open cavity; and
a lifting base body 3208, which is detachably installed at an open end of the open cavity of the lifting shell 3201 to form an accommodating chamber;
the centrifugal drainage assembly is installed on the lifting base body 3208, and the water inlet 3209 is arranged in the lifting shell 3201 and/or the lifting base body 3208.

The lifting device of the embodiment includes a lifting shell 3201, wherein the surface of the lifting shell 3201 is provided with a protruding part used for lifting laundry. The lifting base body 3208 is detachably installed at the open end of the open cavity of the lifting shell 3201 to form an accommodating chamber used for installing a centrifugal drainage assembly.

Furthermore, the plunger base of the embodiment is arranged on the lifting base body 3208, the lifting base body 3208 is provided with a plunger hole used for allowing the sealing plunger to penetrate out of the accommodating chamber, and a plunger channel 3226 is formed in the plunger base. The sealing plunger is arranged in the plunger channel 3226 in a reciprocating motion mode. The elastic piece 3203 and the elastic piece sheath 3227 are both arranged in the plunger channel 3226. Alternatively one end of the elastic piece sheath 3227 is connected to the periphery of an outlet of the plunger channel 3226 in a sealing mode, the other end of the elastic piece sheath 3227 is connected to the portion, extending out of the plunger channel, of the sealing plunger in a sealing mode. The elastic piece is kept to be wrapped by the elastic piece sheath 3227 in a sealing mode in the reciprocating motion process of the sealing plunger, and the thread scraps are prevented from being hung on the elastic piece. Besides, the plunger channel of the embodiment has a guiding function, so it is ensured that the sealing plunger stably reciprocates, the sealing plunger 3213 can be reset more accurately, and the blocking effect of the water outlet of the inner drum is kept well.

As an implementation mode of the embodiment, the sealing plunger of the embodiment includes a sealing column 3213 and a sealing plug 3204 arranged at one end of the sealing column 3213. The elastic piece 3203 is a spring, one end of the spring abuts against the inner wall of the plunger channel 3226, and the other end of the spring abuts against the sealing column 3213. The elastic piece sheath 3227 is an elastic threaded pipe. According to the embodiment, due to the elastic piece sheath 3227 being an elastic threaded pipe, on one hand, the spring can be sealed and wrapped by the elastic piece sheath 3227; meanwhile, in the reciprocating motion process of the centrifugal drainage assembly to be in the closed state and the drainage state, the elastic piece sheath 3227 stretches out and draws back along with stretching out and drawing back of the spring, and the working state of the centrifugal drainage assembly is not affected.

Specifically, the elastic threaded pipe is arranged in the plunger channel and arranged outside the spring to wrap the whole spring, or one end of the elastic threaded pipe is arranged on the periphery of an outlet of the plunger channel 3226 in a sealing mode, and the other end of the elastic threaded pipe is arranged on the sealing plug 3204 in a sealing mode.

Figure 6:
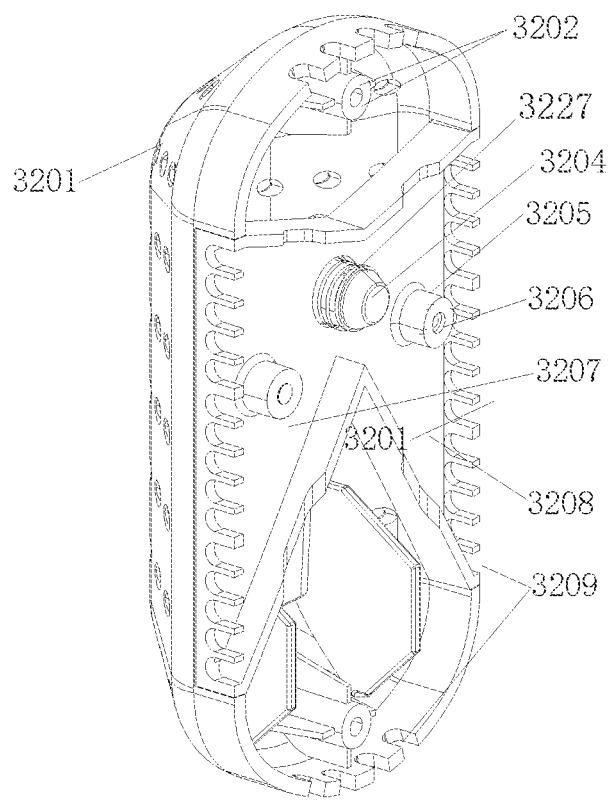
FIG. 6 is a stereoscopic schematic diagram of the laundry lifting device for the washing machine in the embodiment II of the disclosure.
Figure 7:
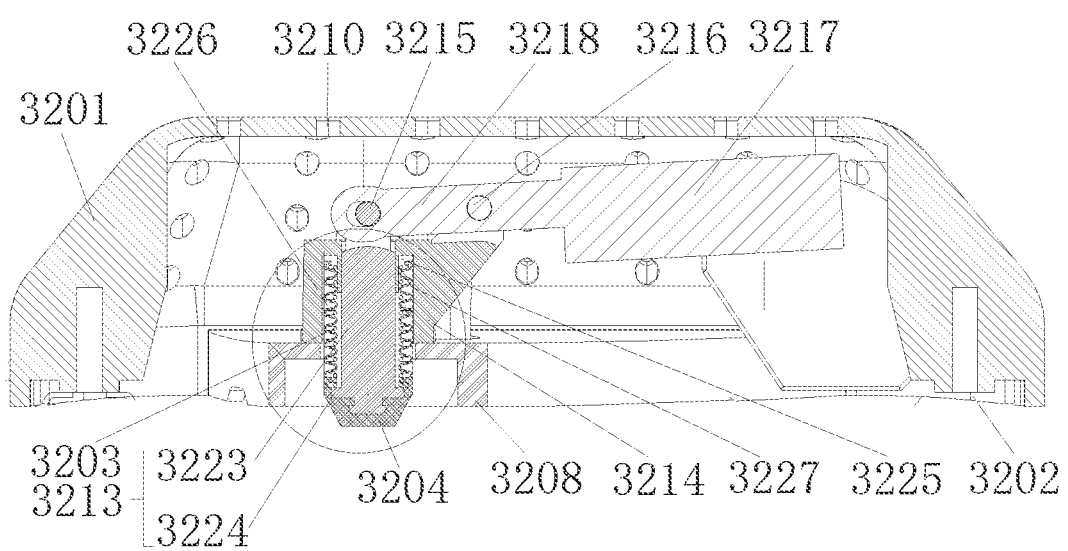
FIG. 7 is a section view of the laundry lifting device for the washing machine in the embodiment II of the disclosure along the A-A plane in FIG. 4.
Figure 8:
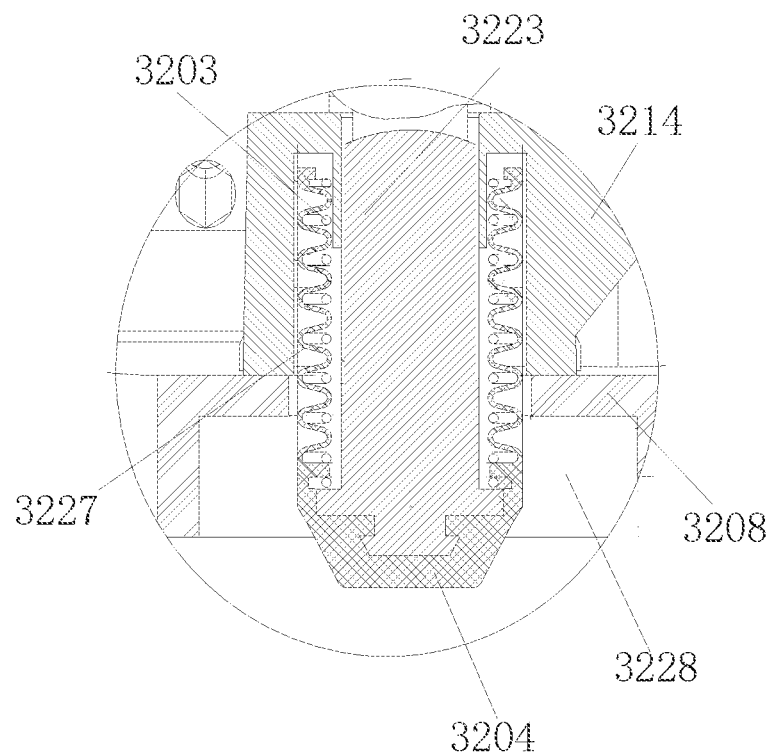
FIG. 8 is a locally enlarged diagram of the laundry lifting device for the washing machine in the embodiment II of the disclosure in FIG. 7.
Figure 9:
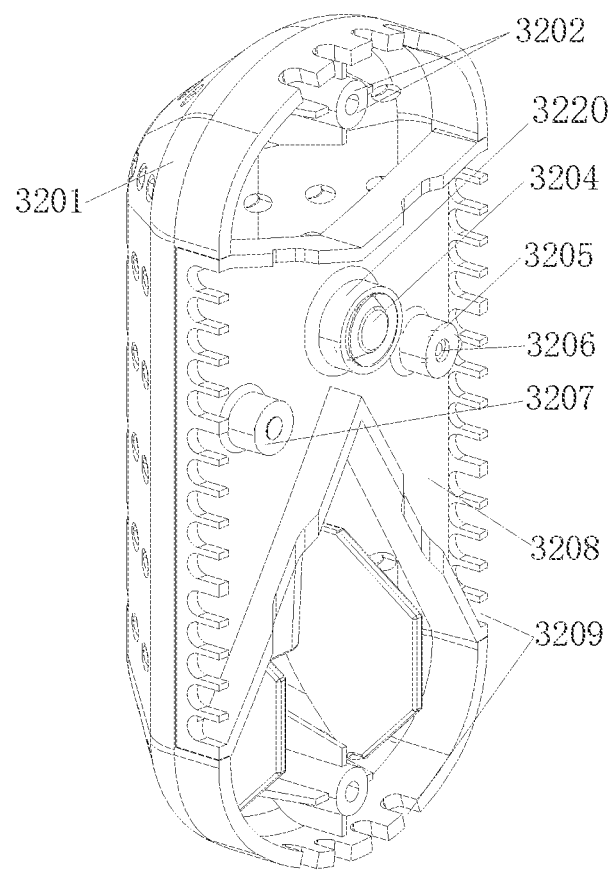
FIG. 9 is a stereoscopic schematic diagram of the laundry lifting device for the washing machine in the embodiment III of the disclosure.
Figure 10:
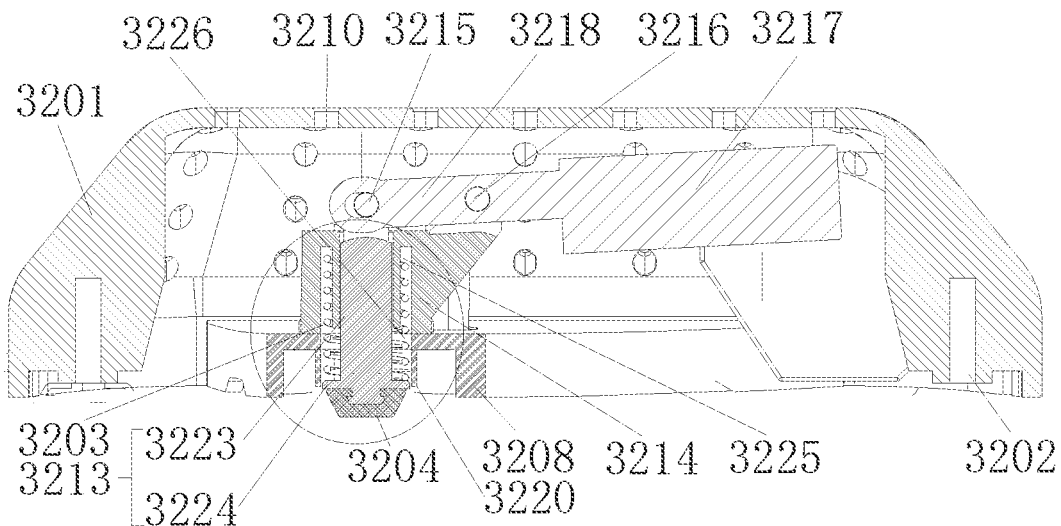
FIG. 10 is a section view of the laundry lifting device for the washing machine in the embodiment III of the disclosure along the A-A plane in FIG. 4.
Figure 11:
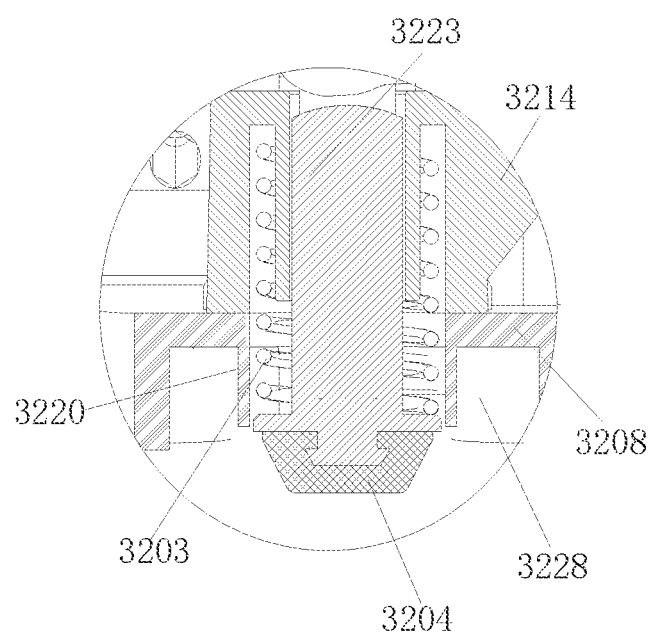
FIG. 11 is a locally enlarged diagram of the laundry lifting device for the washing machine in the embodiment III of the disclosure in FIG. 10.
Figure 12:
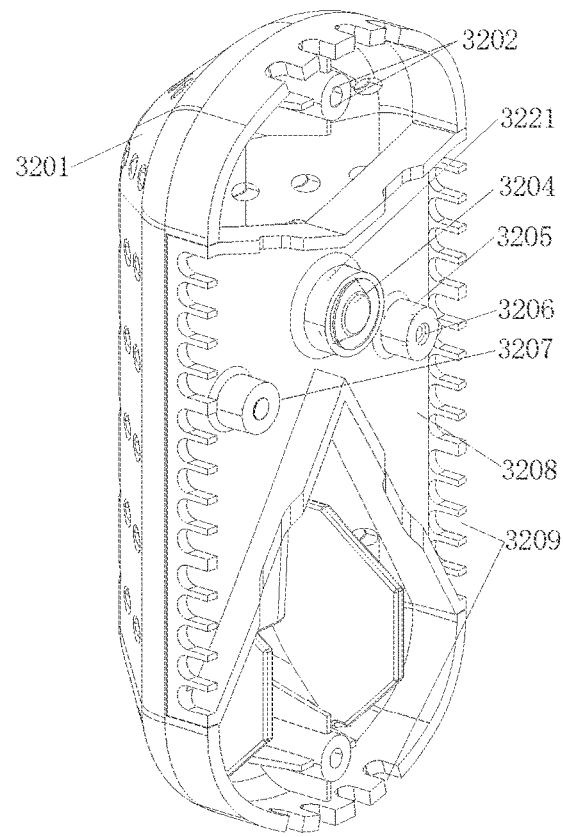
FIG. 12 is a stereoscopic schematic diagram of the laundry lifting device for the washing machine in the embodiment IV of the disclosure.
Figure 13:
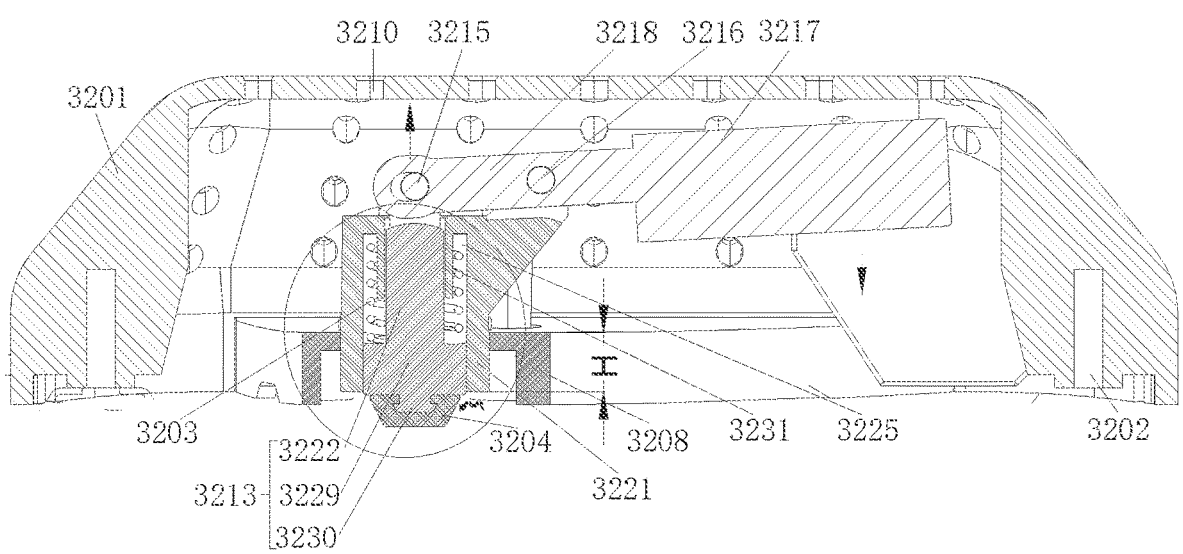
FIG. 13 is a section view of the laundry lifting device for the washing machine in the embodiment IV of the disclosure along the A-A plane in FIG. 4.
Figure 14:
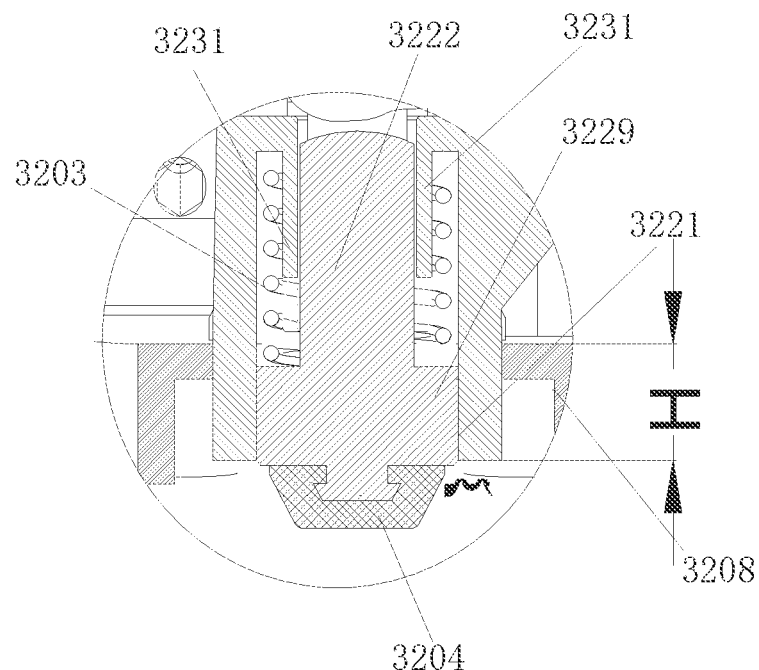
FIG. 14 is a locally enlarged diagram of the laundry lifting device for the washing machine in the embodiment IV of the disclosure in FIG. 13.
Figure 15:
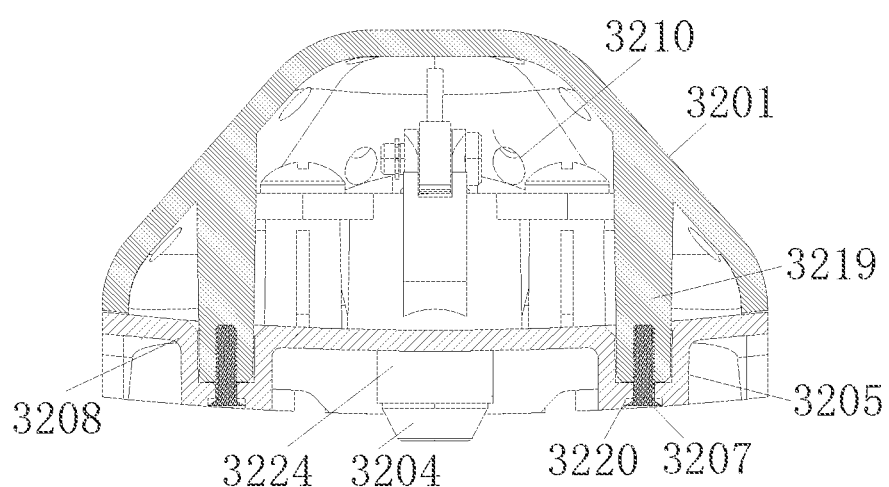
FIG. 15 is a section view of the laundry lifting device for the washing machine in the embodiment I, embodiment II, embodiment III and embodiment IV of the disclosure along the B-B plane in FIG. 4.

As shown in FIG. 6, as one implementation mode of the embodiment, the sealing plug 3204 includes a sealing part fixed at one end of the sealing column. The elastic piece sheath and the sealing part are integrally formed, and the sealing part is configured to extend toward the other end of the sealing column to form the elastic threaded pipe. According to the embodiment, due to the sealing plug 3204 and the elastic piece sheath 3227 being integrally formed, the overall structure of the centrifugal drainage assembly is simplified, and assembly is simpler.

Furthermore, the end, located in the plunger channel 3226, of the elastic threaded pipe is in sealing contact with the inner wall face of the plunger channel under the action of the elastic piece.

Furthermore, the sealing column 3213 includes a guide part 3223 and an installation part 3224 located at one end of the guide part 3223. The guide part 3223 is installed in the plunger channel 3226 in a reciprocating motion mode, and the sealing plug 3204 is installed on the installation part 3224. The support 3208 is of an annular structure internally provided with a hollow channel communicating with the plunger channel 3226.

Specifically, the guide part 3223 is a first column body with cylindrical shape, the installation part 3224 is a second column body with cylindrical shape located at one end of the first column body. The diameter of the first column body is smaller than that of the second column body, and the spring abuts against the end face of the second column body. The other end of the second column body is provided with an installation clamping ring used for assembling the sealing plug 3204, and the sealing plug 3204 is provided with an installation clamping groove matched with the installation clamping ring.

As an implementation mode of the embodiment, a spring installation chamber 3225 used for limiting the other end of the spring is formed in the end of the accommodating chamber for accommodating the sealing column 3213.

Furthermore, the plunger base of the embodiment includes a hollow column 3214 and a support 3208, the hollow column 3214 penetrates through the plunger hole, and the support 3208 is arranged at the end, located outside the accommodating chamber, of the hollow column 3214. The plunger channel 3226 is through the hollow column 3214.

Embodiment III

As shown in FIG. 1, FIG. 4 and FIG. 9-FIG. 11, the embodiment of the disclosure provides the laundry lifting device for the washing machine and the drum washing machine.

The laundry lifting device for the washing machine of the embodiment includes:
- a body, which is internally provided with an accommodating chamber;
- a water inlet, which is arranged in the body and communicated with the accommodating chamber; and
- a centrifugal drainage assembly, which is arranged in the accommodating chamber;
- wherein the initial state of the centrifugal drainage assembly is a closed state, and the centrifugal drainage assembly is opened for drainage under the action of centrifugal force.

The laundry lifting device of the embodiment can be installed on the inner wall of the inner drum of the drum washing machine. In the laundry washing process, the laundry is lifted to a certain height along with rotation of the inner drum and is beaten to fall down. According to the embodiment, the centrifugal drainage assembly is integrated in the laundry lifting device. The initial state of the centrifugal drainage assembly is the closed state, and the inner drum is kept closed to contain washing water. The centrifugal drainage assembly can be opened to drain water under the action of centrifugal force, so that water in the drum washing machine with the hole-free inner drum is drained.

Therefore, the centrifugal drainage assembly is arranged in the lifting device, so that the laundry is lifted and water in the drum washing machine with the hole-free inner drum is drained modular supply is formed, production and assembly are facilitated, and the assembly efficiency is improved.

In the drainage state of the centrifugal drainage assembly, under, if thread scraps are hung on the elastic piece, the thread scraps are not prone to falling off. Even drainage water flow, centrifugal water flow and centrifugal force cannot make the thread scraps separate from the elastic piece. Furthermore, due to the fact that the thread scraps hung on the elastic piece have a certain length, part of the non-hung parts reach a drainage hole of the inner drum and/or the position close to the sealing plunger under the action of drainage water flow, centrifugal water flow and centrifugal force, so sealing failure is caused.

In order to solve the problem that thread scraps are prone to being hung on the elastic piece, the centrifugal drainage assembly includes a sealing plunger capable of doing reciprocating motion and an elastic piece 3203 used for elastic reset of the sealing plunger. The body is provided with a plunger base used for installing the sealing plunger. The plunger base includes a blocking body 3220 for blocking the elastic piece in the reciprocating motion process of the sealing plunger. Thus, in the reciprocating motion process of the centrifugal drainage assembly to in the closed state and the drainage state, the elastic piece 3203 is blocked by the blocking body 3220, the thread scraps are prevented from being hung on the elastic piece, and the working stability of the centrifugal drainage assembly is ensured.

As shown in FIG. 4 and FIG. 9-FIG. 11, the body in the embodiment includes:
- a lifting shell 3201, which is provided with a protruding part on the surface, and is internally provided with an open cavity; and
- a lifting base body 3208, which is detachably installed at an open end of the open cavity of the lifting shell 3201 to form an accommodating chamber;
- the centrifugal drainage assembly is installed on the lifting base body 3208, and the water inlet 3209 is arranged in the lifting shell 3201 and/or the lifting base body 3208.

The lifting device of the embodiment includes a lifting shell 3201, wherein the surface of the lifting shell 3201 is provided with a protruding part used for lifting laundry. The lifting base body 3208 is detachably installed at the open end of the open cavity of the lifting shell 3201 to form an accommodating chamber used for installing a centrifugal drainage assembly.

Furthermore, the plunger base of the embodiment is arranged on a lifting base body 3208, and a plunger hole used for allowing the sealing plunger to penetrate out of the accommodating chamber is formed in the lifting base body 3208. A plunger channel 3226 is formed in the plunger base, and the sealing plunger is arranged in the plunger channel 3226 in a reciprocating motion mode. The blocking body 3220 is an annular baffle arranged on the periphery of an outlet of the plunger channel. The sealing plunger is arranged in the plunger channel in a reciprocating motion mode, and the elastic piece is kept to be blocked by the annular baffle in the reciprocating motion process of the sealing plunger, so that the thread scraps are prevented from being hung on the elastic piece. Besides, the plunger channel of the embodiment has a guiding function, so that it is ensured that the sealing plunger stably reciprocates, the sealing plunger 3213 can be reset more accurately, and the blocking effect of the water outlet of the inner drum is kept well.

Specifically, the plunger base of the embodiment includes a hollow column 3214 and a support 3208, the hollow column 3214 penetrates through the plunger hole, and the support 3208 is arranged at the end, located outside the accommodating chamber, of the hollow column 3214. The plunger channel 3226 is through the hollow column 3214. The support 3208 is of an annular structure, a hollow channel 3228 communicating with the plunger channel 3226 is formed in the support 3208, and the annular baffle is arranged in the hollow channel of the support 3208.

As an implementation mode of the embodiment, the sealing plunger of the embodiment includes a sealing column 3213 and a sealing plug 3204 arranged at one end of the sealing column 3213. The elastic piece 3203 is a spring, one end of the spring abuts against the inner wall of the plunger channel 3226, and the other end of the spring abuts against the sealing column 3213/the sealing plug 3204.

In a drainage state, the sealing plug is retracted into the annular baffle; in a closed state, the sealing plug extends out of the annular baffle, and the spring is blocked by the annular baffle.

Specifically, the height of a projection of the annular baffle on the reciprocating motion path is smaller than that of a projection of the support on the reciprocating motion path, and the height of a projection of the sealing plug on the reciprocating motion path is larger than the height difference of projections of the support and the annular baffle on the reciprocating motion path.

The sealing column 3213 of the embodiment includes a guide part 3223 and an installation part 3224 located at one end of the guide part, and the sealing plug 3204 is installed on the installation part. The guide part 3223 is installed in the plunger channel 3226 in a reciprocating motion mode. An annular protruding ring is arranged at the end, close to the guide part 3223, of the installation part 3224. One end of the spring abuts against the end face of the annular protruding ring. In a closed state, the annular protruding ring is kept in the annular baffle.

Specifically, the guide part 3223 is a first column body with cylindrical shape, and the installation part 3224 is a second column body with cylindrical shape located at one end of the first column body. The diameter of the first column body is smaller than that of the second column body. The spring abuts against the end face of the second column body. The other end of the second column body is provided with an installation clamping ring used for assembling the sealing plug 3204, and the sealing plug 3204 is provided with an installation clamping groove matched with the installation clamping ring.

As an implementation mode of the embodiment, a spring installation chamber 3225 used for limiting the other end of the spring is formed in the end of the accommodating chamber for accommodating the sealing column 3213.

Embodiment IV

As shown in FIG. 1, FIG. 4 and FIG. 12-14, the embodiment of the disclosure provides the laundry lifting device for the washing machine and the drum washing machine.

The laundry lifting device for the washing machine of the embodiment includes:
- a body, which is internally provided with an accommodating chamber;
- a water inlet, which is arranged in the body and communicated with the accommodating chamber; and
- a centrifugal drainage assembly, which is arranged in the accommodating chamber; wherein the initial state of the centrifugal drainage assembly is a closed state, and the centrifugal drainage assembly is opened for drainage under the action of centrifugal force.

The laundry lifting device of the embodiment can be installed on the inner wall of the inner drum of the drum washing machine. In the laundry washing process, the laundry is lifted to a certain height along with rotation of the inner drum and is beaten to fall down. According to the embodiment, the centrifugal drainage assembly is integrated in the laundry lifting device. The initial state of the centrifugal drainage assembly is the closed state, and the inner drum is kept to be closed to independently contain washing water. The centrifugal drainage assembly can be opened to drain water under the action of centrifugal force, so that water in the drum washing machine with the hole-free inner drum is drained.

Therefore, the centrifugal drainage assembly is arranged in the lifting device, so that the laundry is lifted and water in the drum washing machine with the hole-free inner drum is drained, modular supply is formed, production and assembly are facilitated, and the assembly efficiency is improved.

In the drainage state of the centrifugal drainage assembly, if thread scraps are hung on the elastic piece, the thread scraps are not prone to falling off. Even drainage water flow, centrifugal water flow and centrifugal force cannot make the thread scraps separate from the elastic piece. Furthermore, due to the fact that the thread scraps hung on the elastic piece have a certain length, part of the non-hung parts reach a drainage hole of the inner drum and/or the position close to the sealing plunger under the action of drainage water flow, centrifugal water flow and centrifugal force, so sealing failure is caused.

In order to solve the problem that thread scraps are prone to being hung on the elastic piece, the centrifugal drainage assembly includes a sealing plunger capable of doing reciprocating motion and an elastic piece 3203 used for elastic reset of the sealing plunger. The body is provided with a plunger base used for installing the sealing plunger, and the sealing plunger is provided with a sealing part. The plunger base is provided with a sleeve part, the sealing part is arranged in the sleeve part in a sliding and sealing mode, and the elastic piece is arranged in the sealing sleeve in a sealing mode through the sealing part. Thus, in the reciprocating motion process of the centrifugal drainage assembly to be in the closed state and the drainage state, the elastic piece 3203 is sealed in the sealing sleeve through the sealing part, the thread scraps are prevented from being hung on the elastic piece, and the working stability of the centrifugal drainage assembly is ensured.

Furthermore, the sealing plunger of the embodiment includes a sealing column 3213 and a sealing plug 3204. The sealing column 3213 includes a guide column section 3222, the sealing part is a sealing column section 3229 arranged at one end of the guide column 3222, and the sealing plug 3204 is arranged at the end of the sealing column section 3229. The sleeve part includes a guide sleeve 3231 and a sealing sleeve 3221. The guide column section 3222 is arranged in the guide sleeve 3231 in a reciprocating motion mode, and the sealing column section 3229 is arranged in the sealing sleeve 3221 in a sliding sealing mode. The elastic piece 3203 is arranged in the guide sleeve 3231, one end of the elastic piece 3203 abuts against the guide sleeve 3231, and the other end of the elastic piece 3203 abuts against the guide column section 3222 or the sealing column section 3229. According to the embodiment, the guide column section 3222 reciprocates in the guide sleeve 3231 to drive the sealing plug 3204 to reciprocate along a certain path, so that the water outlet of the inner drum is controlled to be open and close. The sealing column section 3229 is arranged in the sealing sleeve 3221 in a sliding and sealing mode, so that the elastic piece 3203 is sealed in the guide sleeve 3231, and the elastic piece 3203 is prevented from being outside of the guide sleeve and from hanging the thread scraps.

Furthermore, the guide sleeve 3231 and the sealing sleeve 3221 are both cylindrical and have the same inner diameter 3221. The guide column section 3222 and the sealing column section 3223 are both cylindrical, and the outer diameter of the guide column section 3222 is smaller than that of the sealing column section 3229. The outer diameter of the sealing column section 3229 is equal to or slightly smaller than the inner diameter of the sealing sleeve 3221.

Preferably, the guide sleeve 3231 and the sealing sleeve 3221 are integrally formed, and the guide column section 3222 and the sealing column section 3229 are integrally formed.

In addition, an inner ring matched with the guide column section 3222 is arranged in the guide sleeve 3231. The inner ring is spaced from the inner wall of the guide sleeve 3231, and an opening is formed in the direction facing the sealing sleeve 3221 to form an installation chamber 3225 for installing the elastic piece 3203. Preferably, the elastic piece 3203 is a cylindrical spring which is arranged on the guide column section 3222 in a sleeving mode.

As an implementation mode of the disclosure, the body includes a lifting shell 3201 which is internally provided with an open cavity; and a lifting base body 3208, which is detachably installed at an open end of the open cavity of the lifting shell 3201 to form an accommodating chamber. The plunger base is arranged on the lifting base body. A plunger hole used for allowing the sealing plunger to penetrate out of the accommodating chamber is formed in the lifting base body. The sleeve part of the plunger base penetrates through the plunger hole. The plunger base further includes a support 3208 which is arranged at one end, arranged outside the accommodating chamber, of the sleeve part. The sealing sleeve 3221 extends out of the accommodating chamber, and the height of the projection of the sealing sleeve on the reciprocating motion path is smaller than or equal to the height of the projection of the support on the reciprocating motion path.

Furthermore, the support 3208 is of an annular structure arranged on the periphery of the sealing sleeve 3221 in a sleeving mode. The axial length, located outside the accommodating chamber, of the sealing sleeve 3221 is smaller than the axial length of the support 3208.

An installation column 3230 is arranged at the end of the sealing column section 3229. A limiting protruding ring is arranged on the installation column 3230, the sealing plug 3204 is provided with a limiting groove with an opening, and the limiting protruding ring is installed in the limiting groove in a limiting mode.

Embodiment V

The embodiment of the disclosure mainly solves the problem of how to accurately determine the water inflow of a drum washing machine with a hole-free inner drum, and the specific solution is as follows.

Figure 16:
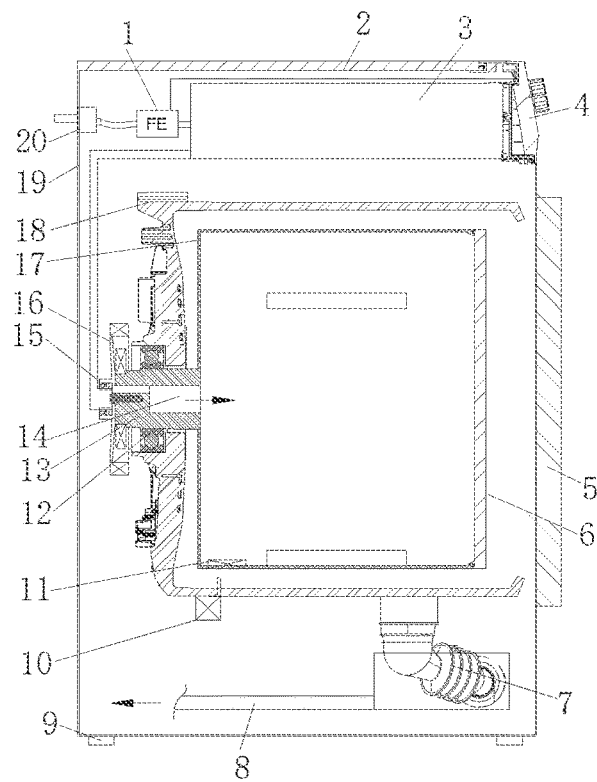
FIG. 16 is a principle schematic diagram of the drum washing machine in the embodiment V of the disclosure.

As shown in FIG. 16, the drum washing machine includes an inner drum 17 and a water inlet pipeline communicating with the inner drum 17. The inner drum 17 is a hole-free inner drum and used for containing washing water when laundry is washed, and a flow sensor 1 used for detecting the water inlet flow is arranged on the water inlet pipeline.

According to the embodiment, a flow sensor 1 is arranged on the water inlet pipeline to monitor the water inflow. When the set water amount is reached, a water inlet valve 20 is closed, and water inlet is completed. According to the embodiment, the flow sensor is adopted to solve the water inlet problem of the drum washing machine with the hole-free inner drum according to the set water level, the washing effect is ensured, the structure is simple, and it is convenient to control.

Furthermore, the drum washing machine of the embodiment includes a water inlet valve 20 and a detergent box 3. The water inlet pipeline includes a first water inlet pipe and a second water inlet pipe, an outlet end of the water inlet valve 20 is communicated with the detergent box 3 through the first water inlet pipe, and an outlet end of the detergent box 3 is communicated with the inner drum 17 through the second water inlet pipe. The flow sensor 1 is arranged on the first water inlet pipe or the second water inlet pipe.

Preferably, the flow sensor 1 is arranged on the first water inlet pipe, so that the detergent in the detergent box can be prevented from entering the flow sensor 1.

The drum washing machine of the embodiment includes a main controller 4, and the flow sensor 1 is electrically connected with the main controller 4 through a circuit. The main controller 4 can detect the water inlet amount of the inner drum 17 in real time, and the water inlet valve 20 is closed when the set water inlet amount is reached.

As an implementation mode of the embodiment, the flow sensor 1 is a rotor flow sensor, or a turbine flow sensor, or an ultrasonic flow sensor, or an electromagnetic flow sensor, or a pore plate flow sensor.

According to the embodiment, the flow sensor 1 can be arranged at any position of the water inlet pipeline. Preferably, the flow sensor 1 is arranged in downstream of the water inlet valve 20 to accurately meter the flow of water entering the sealed inner drum 17. The flow sensor 1 is connected with the main controller 4 through a circuit, and the main controller 4 can detect the water inlet amount of the inner drum 17 in real time. The water inlet valve 20 is closed when the set water inlet amount is reached.

In order to feed water into the hole-free inner drum of the embodiment, the drum washing machine of the embodiment includes a driving motor 16 and an inner drum shaft 13, the inner drum 17 is in transmission connection with the inner drum shaft 13 and is driven to rotate by the driving motor 16. A hollow channel 14 communicating with the interior of the inner drum 17 is formed in the inner drum shaft 13, and the water inlet pipeline is communicated with the hollow channel of the inner drum shaft 13.

Specifically, the inner drum shaft 13 is connected with the driving motor 16, the driving motor 16 includes a stator and a rotor, and the rotor is fixedly connected with the inner drum shaft 13. A through hole is formed in the center of the rotor, and the water inlet pipeline penetrates through the through hole of the rotor to be communicated with the hollow channel 14 of the inner drum shaft 13.

Furthermore, a first dynamic sealing structure 15 is arranged between the water inlet pipeline and the through hole of the rotor, and a second sealing structure is arranged between the through hole of the rotor and the hollow channel 14 of the inner drum shaft 13.

In order to achieve drainage of the hole-free inner drum, the drum washing machine of the embodiment includes an outer drum 18, and an inner drum drainage hole is formed in the side wall of the inner drum 17. A one-way valve plug 11 being normally closed is installed on the inner drum drainage hole, and a pushing rod mechanism 10 used for pushing the one-way valve plug 11 to be open for drainage is installed on the outer drum 18.

As an implementation mode of the embodiment, a locking mechanism used for locking rotation of the inner drum 17 is further arranged on the outer drum 18, and the pushing rod mechanism 10 pushes the one-way valve plug 11 to be open for drainage after the locking mechanism locks the inner drum.

As another implementation mode of the embodiment, a plurality of dewatering holes are formed in the side wall of the inner drum 17, and centrifugal valves are installed on the dewatering holes. The rotation of the inner drum is controlled to reach a certain rotating speed, and the centrifugal valves are opened under the action of centrifugal force to conduct washing drainage or dewatering drainage.

The embodiment of the disclosure also provides a control method of the drum washing machine. In the water inlet process during a washing/rinsing program executed by a washing machine, the flow sensor detects the water inlet flow value in real time, the washing machine calculates the water inlet amount according to the water inlet flow value and the water inlet time, and water inlet is stopped when the water inlet amount reaches the set water inlet amount of the washing machine.

The drum washing machine is provided with a plurality of water inlet flow values which can be selected by a user, and water is fed into the washing machine according to the water inlet flow value selected by the user.

The drum washing machine has a laundry weighing function, and water can be fed by determining the water inlet flow value according to the weight of laundry.

Embodiment VI

Figure 17:
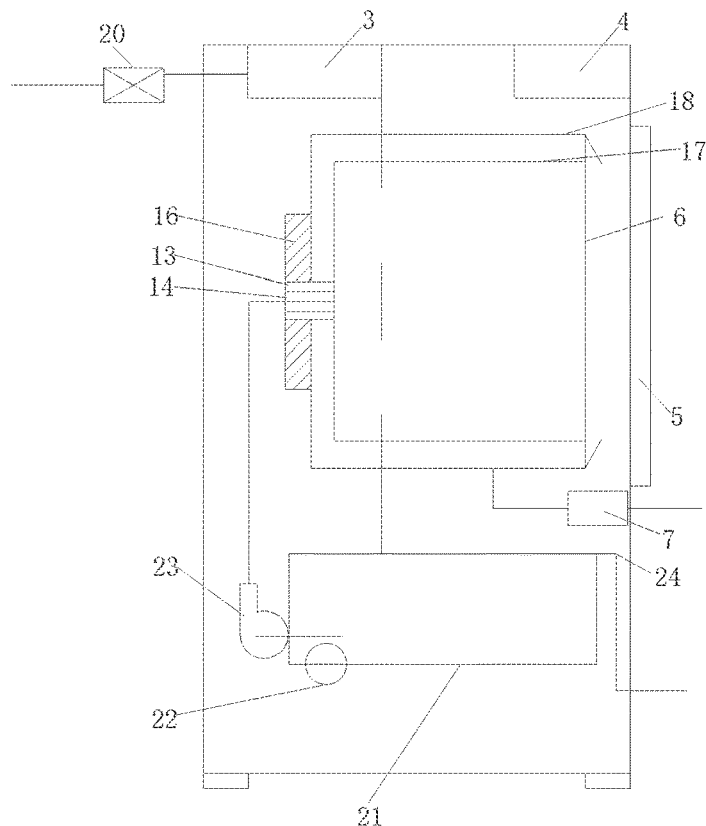
FIG. 17 is a principle schematic diagram of the drum washing machine in the embodiment VI of the disclosure (implementation mode I)
Figure 18:
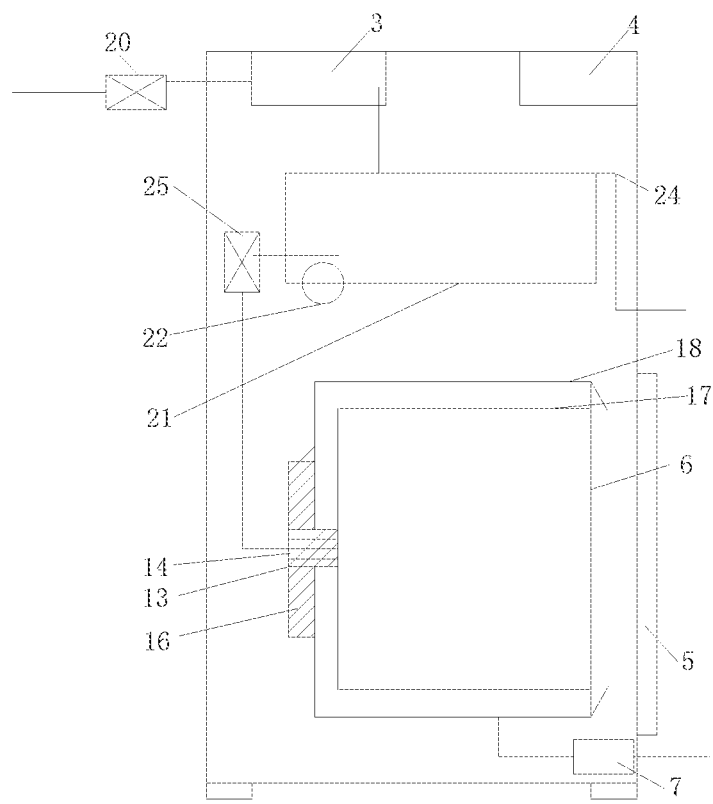
FIG. 18 is a principle schematic diagram of the drum washing machine in the embodiment VI of the disclosure (implementation mode II)
Figure 19:
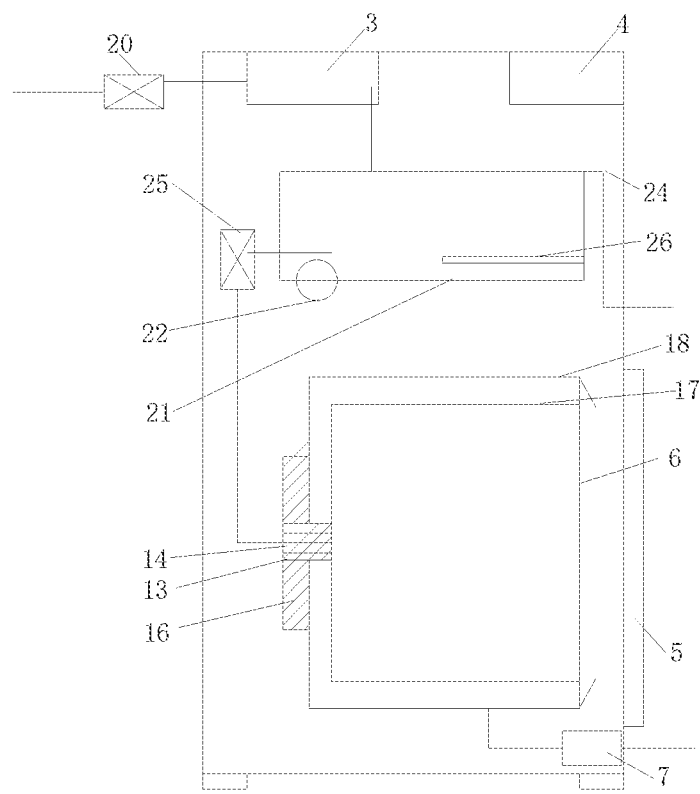
FIG. 19 is a principle schematic diagram of the drum washing machine in the embodiment VI of the disclosure (implementation mode III)

As shown in FIG. 17-FIG. 19, the drum washing machine includes an inner drum 17 and a water inlet pipeline, and the inner drum is a hole-free inner drum and contains washing water when laundry are washed. The drum washing machine further includes a water measuring device used for measuring the water inlet amount, the water inlet pipeline is communicated with the water measuring device, and the water measuring device is communicated with the inner drum.

In the embodiment the water measuring device is arranged in the drum washing machine, water enters the water measuring device for quantitative measurement before entering the inner drum 17. The water measuring frequency of the water measuring device is determined according to the set water level, and therefore the problem that water enters the drum washing machine with the hole-free inner drum according to the set water level is solved, the washing effect is ensured, the structure is simple, and the control is convenient.

Furthermore, the water measuring device of the embodiment includes a water measuring tank 21. The water measuring tank 21 is provided with a water inlet and a water outlet, the water inlet is communicated with the water inlet pipeline, and the water outlet is communicated with the inner drum 17. The water outlet is provided with a water outlet control device which is used for controlling the water outlet to be opened when the water amount in the water measuring tank 21 reaches a set value.

As an implementation mode of the embodiment, as shown in FIG. 17, the water measuring tank 21 is arranged below the inner drum 17. The water measuring device includes a water level detection device 22 used for detecting the water level in the water measuring tank 21. The water outlet control device is a water tank drainage pump 23. When the water level detection device 22 detects that the water level in the water measuring tank 21 reaches a set value, the water tank drainage pump 23 is started to pump water in the water measuring tank 21 into the inner drum 17.

As an implementation mode of the embodiment, as shown in FIG. 18, the water measuring tank 21 is arranged above the inner drum 17. The water measuring device includes a water level detection device 22 used for detecting the water measuring tank, and the water outlet control device is a water tank drain valve 25. The water tank drain valve 25 is opened to drain water in the water measuring tank 21 into the inner drum when the water level detection device 22 detects that the water level in the water measuring tank 21 reaches a set value.

The water level detection device 22 is a liquid level sensor, the liquid level sensor includes an air chamber and a sensor unit, and the air chamber is communicated with the water measuring tank. Alternatively the water level detection device 22 includes a plurality of water level detection probes which are arranged in the water measuring tank in the depth direction of the water measuring tank.

As one implementation mode of the embodiment, the water measuring tank 21 is arranged above the inner drum 17, the water outlet is arranged in the bottom wall of the water measuring tank 21, and the water outlet control device is a water tank one-way valve for keeping the water outlet normally closed. When the water amount in the water measuring tank reaches a certain value, the water tank one-way valve is opened under the water pressure. After water in the water measuring tank 21 is discharged into the inner drum 17, the water tank one-way valve is reset to keep the water outlet closed.

An overflow hole 24 is formed in the water measuring tank 21, and the overflow hole 24 is connected with an overflow pipeline used for guiding out water overflowing out of the water measuring tank.

Preferably, the drum washing machine includes a drainage pipeline 8, and the overflow pipeline is communicated with the drainage pipeline 8.

As an implementation mode of the embodiment, as shown in FIG. 19, the water measuring device includes a heating device 26 arranged in the water measuring tank 21 and a water temperature detection device for detecting the water temperature in the water measuring tank.

A control method of the drum washing machine in the embodiment of the disclosure comprises, in a washing/rinsing program of the washing machine, controlling the washing water to enter the water measuring tank, stopping feeding water when the water amount in the water measuring tank reaches a set value, the water in the water measuring tank being completely discharged into the inner drum, restarting to feed water into the water measuring tank, and performing repeatedly the above steps until the water level in the inner drum reaches a set value, and water feeding being ended.

Furthermore, the washing machine controls the washing water to enter the water measuring tank. When the water amount in the water measuring tank reaches a set value, water feeding is stopped. The heating device is controlled to operate to heat the washing water. When the water temperature detection device detects that the water temperature in the water measuring tank reaches the set value, the water in the water measuring tank is completely discharged into the inner drum.

Embodiment VII

This embodiment mainly solves the problem of unbalanced air pressure in the sealed cabin of the hole-free inner-drum drum washing machine. Specifically, feeding water is suddenly cut off by the solenoid valve, especially by the water cutoff of the tap water network, so a negative pressure is formed to cause the washing water in the sealed cabin being back to the pipe network. There is gas inside the inner drum, so it is difficult to enter the water.

Figure 20:
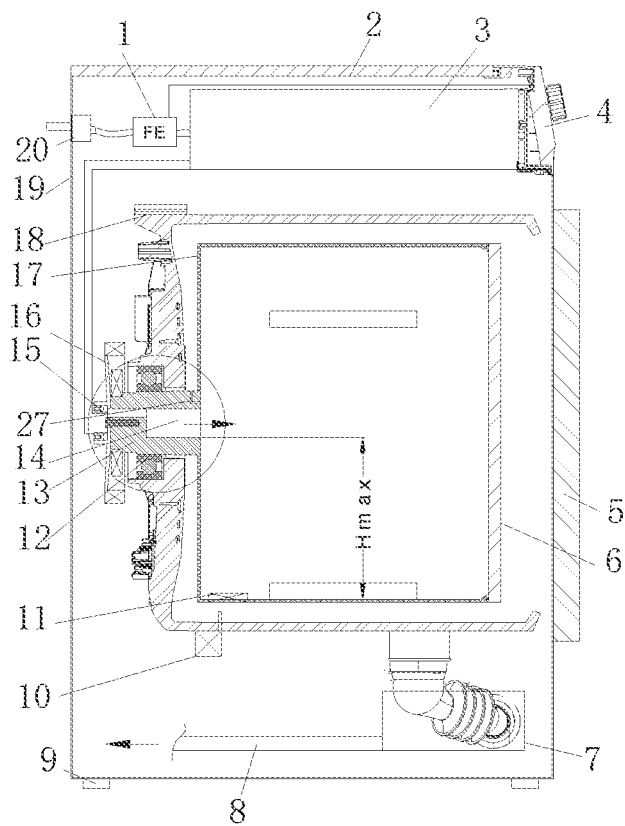
FIG. 20 is a principle schematic diagram of the drum washing machine in the embodiment VII of the disclosure.
Figure 21:
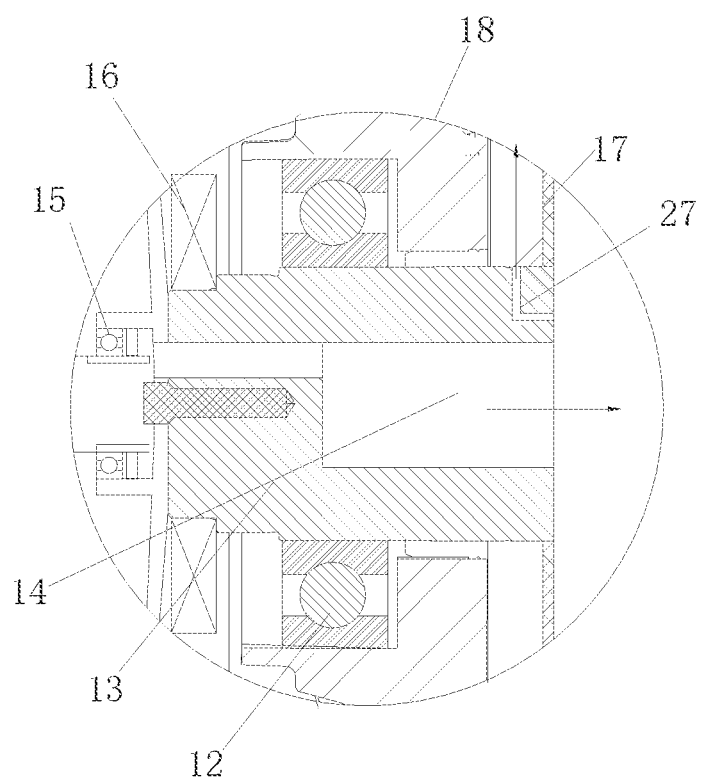
FIG. 21 is a locally enlarged diagram (the pressure relief state) of the drum washing machine in the embodiment VII of the disclosure in FIG. 20.
Figure 22:
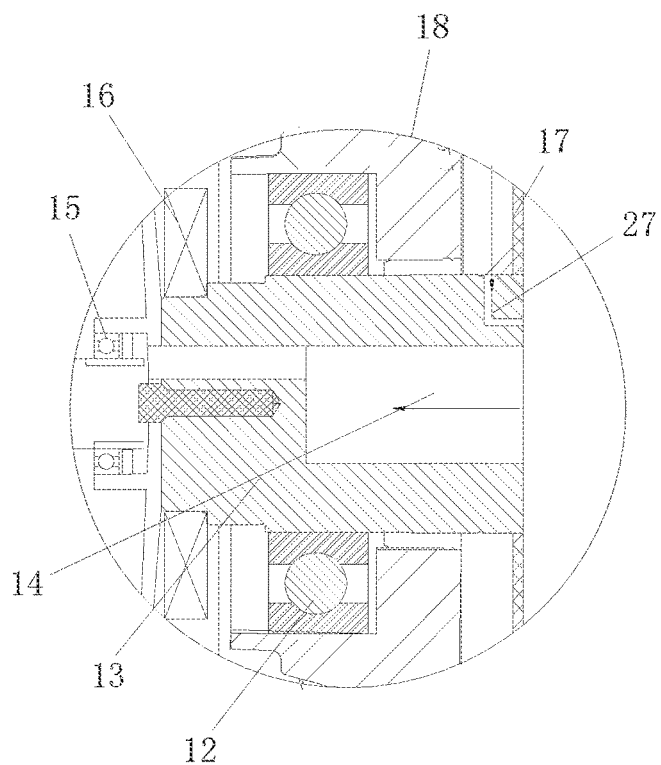
FIG. 22, a locally enlarged diagram (the pressurization state) of the drum washing machine in the embodiment VII of the disclosure in FIG. 20.
Figure 23:
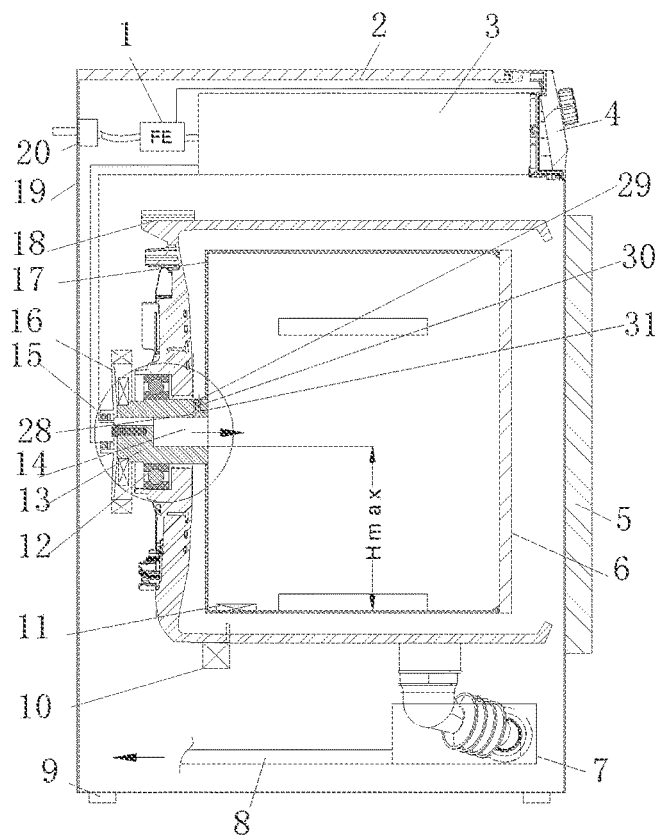
FIG. 23 is a principle schematic diagram of the drum washing machine in the embodiment VIII of the disclosure.

As shown in FIG. 20-FIG. 22, the drum washing machine of the embodiment includes an inner drum 17, and the inner drum 17 is a hole-free inner drum and is used for containing washing water in washing laundry. The drum washing machine further includes an air pressure balancing mechanism used for connecting the inner drum 17 with the external environment to balance the air pressure in the inner drum.

When water enters, gas in the sealed cabin of the inner drum is pressed and can overflow through the balancing mechanism, so air pressure balance is guaranteed.

When feeding water is suddenly cut off, external atmosphere can quickly enter the sealed cabin of the inner drum and destroy suck-back, so air pressure balance is guaranteed, and washing water is prevented from being sucked into a tap water pipe network.

During dewatering, the air pressure balancing mechanism can also ensure the air pressure balance of the inner drum.

As an implementation mode of the embodiment, the air pressure balancing mechanism includes a pressure equalizing hole channel 27 arranged on the inner drum 17. One end, communicating with the interior of the inner drum 17, of the pressure equalizing hole channel 27 is arranged at the position, close to a rotating center shaft, of the inner drum 17 and is always higher than the highest water level position in the inner drum 17.

The drum washing machine of the embodiment includes a driving motor 16 and an inner drum shaft 13, and the inner drum 17 is in transmission connection with the inner drum shaft 13 and is driven to rotate by the driving motor 16. The pressure equalizing hole channel 27 is formed in the inner drum shaft 13 to connect the interior of the inner drum 17 with the external environment, and the highest water level in the inner drum 17 is lower than the inner drum shaft 13. Therefore, water in the inner drum can be prevented from flowing out of the pressure equalizing hole channel.

The drum washing machine of the embodiment includes an outer drum 18, the inner drum 17 is arranged in the outer drum 18, and water from the inner drum 17 is discharged through the outer drum 18. An inner drum door 6 for sealing the inner drum is installed on a drum opening of the inner drum 17. A drum opening of the outer drum 18 is open. One end of the pressure equalizing hole channel 27 is communicated with the interior of the inner drum 17, and the other end of the pressure equalizing hole channel 27 is arranged in the outer drum 18 and communicates with the inner drum 17. In this way, extreme conditions are prevented, and water discharged from the pressure equalizing hole channel can be collected in the outer drum 18.

Furthermore, an inner drum drainage hole is formed in the side wall of the inner drum 17 of the embodiment, an one-way valve plug 11 being normally closed is installed on the inner drum drainage hole, and a pushing rod mechanism 10 used for pushing the one-way valve plug 11 to be open for drainage is installed on the outer drum 18.

Preferably, the outer drum 18 is further provided with a locking mechanism used for locking rotation of the inner drum. After the locking mechanism locks the inner drum, the pushing rod mechanism pushes the one-way valve plug to be open for drainage.

Furthermore, the drum washing machine of the embodiment includes a water inlet pipeline, a hollow channel 14 communicating with the interior of the inner drum 17 is arranged in the inner drum shaft 13, and the water inlet pipeline is communicated with the hollow channel 14 of the inner drum shaft 13. The pressure equalizing hole channel 27 and the hollow channel 14 is respectively communicated with the interior of the inner drum 17 and are mutually spaced. Therefore, gas in the sealed cabin of the inner drum can be smoothly discharged to keep air pressure balance in the inner drum, and water leakage caused by the fact that inflow water is directly discharged from the pressure equalizing hole channel 27 is prevented.

Specifically, the hollow channel 27 extends from one end to the other end of the inner drum shaft in the central axis direction. The pressure equalizing hole channel includes a first hole channel section and a second hole channel section. The first hole channel section is parallel to the hollow channel, one end of the first hole channel section is communicated with the interior of the inner drum. One end of the second hole channel section is communicated with the first hole channel section, and the other end extends to the outer peripheral wall of the inner drum shaft and is communicated with the interior of the outer drum.

Preferably, the second hole channel section is perpendicular to the first hole channel section to form an L-shaped pressure equalizing hole channel.

Furthermore, the inner drum shaft 13 is connected with a driving motor 16. The driving motor 16 includes a stator and a rotor, and the rotor is fixedly connected with the inner drum shaft. A through hole is formed in the center of the rotor, and the water inlet pipeline penetrates through the through hole of the rotor to be communicated with the hollow channel of the inner drum shaft.

Preferably, a first dynamic sealing structure is arranged between the water inlet pipeline and the through hole of the rotor, and a second sealing structure is arranged between the through hole of the rotor and the hollow channel of the inner drum shaft.

According to the drum washing machine in the embodiment, a plurality of dewatering holes are formed in the side wall of the inner drum 17. The centrifugal valves are installed on the dewatering holes, and the centrifugal valves are opened under the effect of centrifugal force to conduct dewatering and drainage.

Embodiment VIII

This embodiment mainly solves the problem of unbalanced air pressure in the sealed cabin of the inner-drum having free holes in drum washing machine. Specifically the feeding water is suddenly cut off by the solenoid valve, especially by the water cutoff of the tap water network, so a negative pressure is formed to cause the washing water in the sealed cabin to be back to the pipe network. Or there is gas inside the inner drum, and it is difficult to enter the water.

As shown in FIG. 23-FIG. 27, the drum washing machine of the embodiment includes an inner drum 17 which is a hole-free inner drum and is used for containing washing water when laundry are washed. The drum washing machine further includes a pressurization mechanism and/or a pressure relief mechanism which are/is used for connecting the inner drum with the external environment so as to balance air pressure in the inner drum 17.

The pressurization mechanism of the embodiment includes a pressurization hole channel 28 and a negative pressure safety valve 29, and the negative pressure safety valve 29 is arranged on the pressurization hole channel 28 and used for unidirectionally conducting the pressurization hole channel 28 when the internal pressure of the inner drum 17 is smaller than the pressure of the external environment. gas in external environment enters the inner drum 17 through the pressurization hole channel 28 to be pressurized until the internal air pressure of the inner drum 17 is balanced with the external environment air pressure, and the negative pressure safety valve 29 is closed.

The pressure relief mechanism of the embodiment includes a pressure relief hole channel 30 and a positive pressure safety valve 31, and the pressure relief hole channel 30 is formed in the position, close to the rotating center shaft, of the inner drum 17 and is always higher than the highest water level position in the inner drum 17. The positive pressure safety valve 31 is arranged on the pressure relief hole channel 30. When the internal pressure of the inner drum 17 is larger than the pressure of the external environment, the pressure relief hole channel 30 is unidirectionally conducted for pressure relief until the internal air pressure of the inner drum 17 is balanced with the air pressure of the external environment, and then the positive pressure safety valve 31 is closed.

Figure 24:
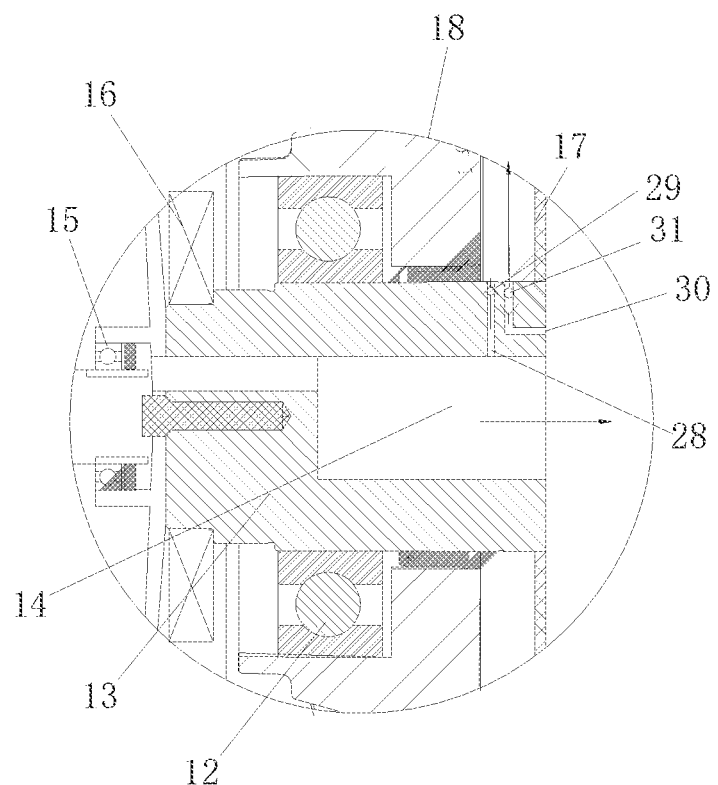
FIG. 24 is a locally enlarged diagram (the pressure relief state in the first implementation mode) of the drum washing machine in the embodiment VIII of the disclosure in FIG. 23.

As shown in FIG. 24, when water enters, gas in a sealed cabin of the inner drum 17 is pressed. Once the gas pressure is larger than a set value of the positive pressure safety valve, the positive pressure safety valve is opened and the gas can overflow through the pressure relief hole channel, so that the gas pressure balance is ensured.

As shown in FIG. 24, when feeding water is suddenly cut off, gas in a sealed cabin of the inner drum 17 is pressed. Once the gas pressure is smaller than a set value of the positive pressure safety valve, gas in external environment can quickly enter the sealed cabin and destroy suck-back, so that air pressure balance is guaranteed, and washing water is prevented from being sucked into a tap water pipe network.

During dewatering, the air pressure balancing mechanism can also ensure the air pressure balance of the inner drum.

The drum washing machine of the embodiment includes a driving motor 16 and an inner drum shaft 13. The inner drum 17 is in transmission connection with the inner drum shaft 13 and is driven to rotate by the driving motor 16. The pressurization hole channel 28 and/or the pressure relief hole channel 30 are/is arranged in the inner drum shaft 13 and connect the interior of the inner drum 17 and the external environment, and the highest water level in the inner drum 17 is lower than the inner drum shaft 13.

The drum washing machine of the embodiment includes an outer drum 18, the inner drum 17 is arranged in the outer drum 18, and water from the inner drum 17 is discharged through the outer drum 18. An inner drum door 6 for sealing the inner drum is installed at a drum opening of the inner drum 17. A drum opening of the outer drum 18 is open. One end of the pressurization hole channel 28 and/or the pressure relief hole channel 30 is communicated with the interior of the inner drum 17, and the other end of the pressurization hole channel 28 and/or the pressure relief hole channel 30 is arranged in the outer drum 18 and communicated with the inner drum 17.

The drum washing machine of the embodiment includes a water inlet pipeline. A hollow channel 14 communicating with the interior of the inner drum 17 is formed in the inner drum shaft 13, and the water inlet pipeline is communicated with the hollow channel 14 of the inner drum shaft 13. The pressure relief hole channel 30 and the hollow channel 14 are respectively communicated with the interior of the inner drum 17 and are mutually spaced.

Figure 25:
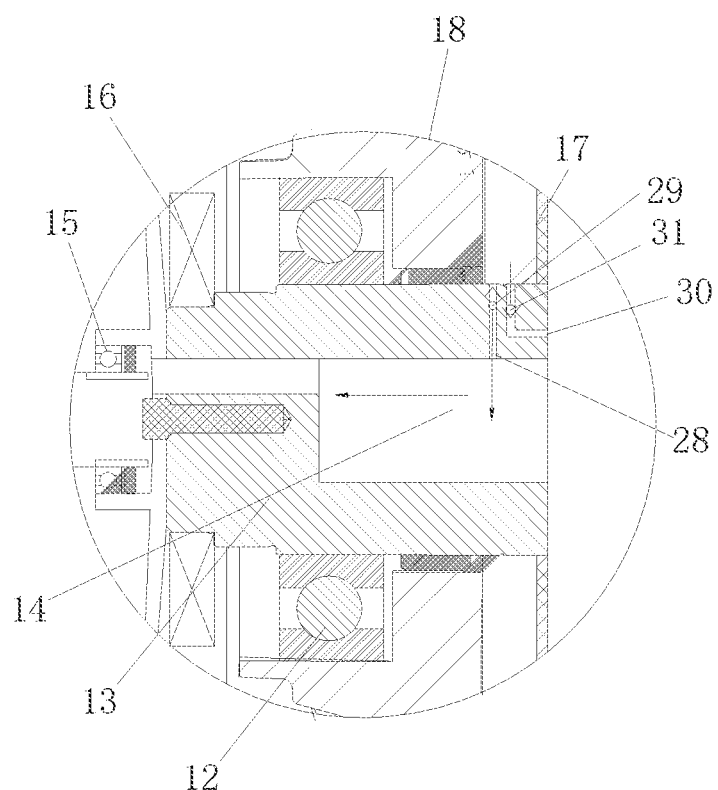
FIG. 25 is a locally enlarged diagram (the pressurization state in the first implementation mode) of the drum washing machine in the embodiment VIII of the disclosure in FIG. 23.

As shown in FIG. 24 and FIG. 25, the hollow channel 14 extends from one end to the other end of the inner drum shaft 13 along the central axis direction. The pressure relief hole channel 30 includes a first hole channel section and a second hole channel section, the first hole channel section is parallel to the hollow channel, and one end of the first hole channel section is communicated with the interior of the inner drum. One end of the second hole channel section is communicated with the first hole channel section, and the other end of the second hole channel section extends to the outer peripheral wall of the inner drum shaft and is communicated with the interior of the outer drum.

Preferably, the second hole channel section is perpendicular to the first hole channel section to form an L-shaped pressure relief hole channel.

The drum washing machine of the embodiment includes a water inlet pipeline, a hollow channel 14 communicating with the interior of the inner drum 17 is formed in the inner drum shaft 13, and the water inlet pipeline is communicated with the hollow channel 14 of the inner drum shaft 13. The pressurization hole channel 28 is communicated with the hollow channel 14.

Furthermore, the hollow channel 14 extends from one end to the other end of the inner drum shaft 13 in the direction of the central axis, one end of the pressurization hole channel 28 is communicated with the hollow channel 14, and the other end of the pressurization hole channel 28 extends to the peripheral wall of the inner drum shaft 13 to communicate with the interior of the outer drum 18.

Preferably, the pressurization hole channel 28 and the hollow channel 14 are perpendicular to each other.

The inner drum shaft of the embodiment is connected with a driving motor. The driving motor includes a stator and a rotor, and the rotor is fixedly connected with the inner drum shaft. A through hole is formed in the center of the rotor, and the water inlet pipeline penetrates through the through hole of the rotor to be communicated with the hollow channel of the inner drum shaft.

Preferably, a first dynamic sealing structure is arranged between the water inlet pipeline and the through hole of the rotor, and a second sealing structure is arranged between the through hole of the rotor and the hollow channel of the inner drum shaft.

Figure 26:
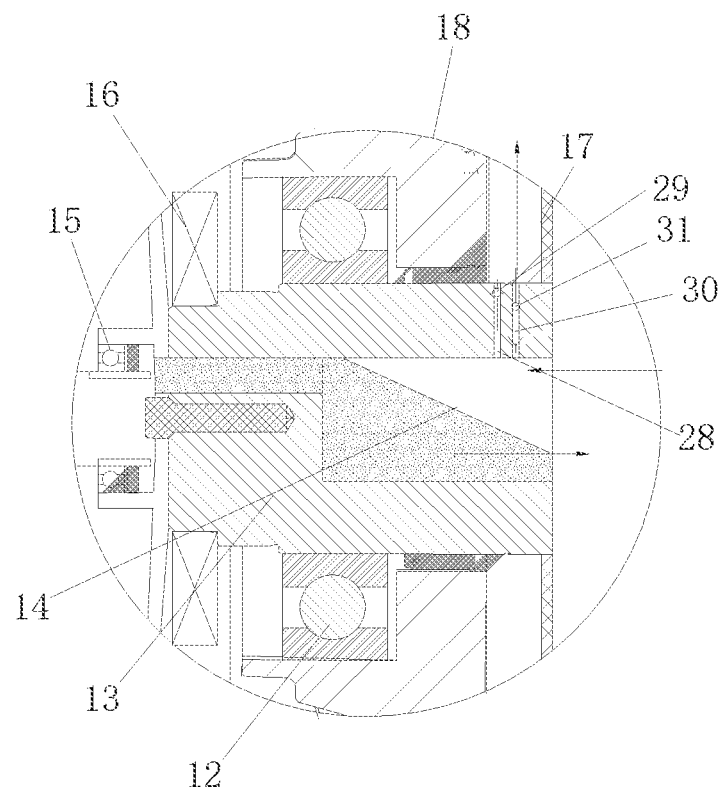
FIG. 26 is a locally enlarged diagram (the pressure relief state in the second implementation mode) of the drum washing machine in the embodiment VIII of the disclosure in FIG. 23.
Figure 27:
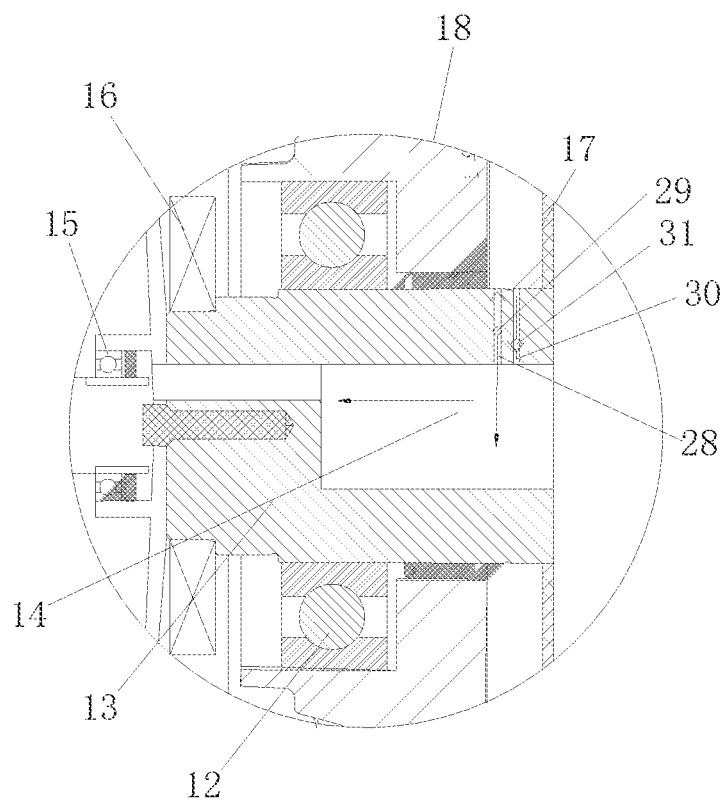
FIG. 27 is a locally enlarged diagram (the pressurization state in the second implementation mode) of the drum washing machine in the embodiment VIII of the disclosure in FIG. 23.

As shown in FIG. 26 and FIG. 27, the pressurization hole channel 28 and the pressure relief hole channel 30 are both arranged on the inner drum shaft 13, and openings of the pressurization hole channel 28 and the pressure relief hole channel 30 communicating with the atmosphere are both arranged on the inside of the outer drum 18. Openings of the pressurization hole channel 28 and the pressure relief hole channel 30 communicating with the sealed cabin of the inner drum 17 are all arranged on the inside of the water inlet channel 14 of the inner drum shaft 13.

Preferably, the pressurization hole channel 28 and the pressure relief hole channel 30 are both arranged on the inner drum shaft 13. Openings of the pressurization hole channel 28 and the pressure relief hole channel 30 communicating with the atmosphere are both arranged on the inside of the outer drum 18, and openings of the pressurization hole channel 28 and the pressure relief hole channel 30 communicating with the sealed cabin of the inner drum 17 are all arranged on the inside of the sealed cabin.

The above embodiments can be implemented independently and can also be implemented in a combined mode.

The above is only preferred embodiments of the disclosure, and does not limit the disclosure in any form. Although the disclosure is disclosed by the above preferred embodiments, the above preferred embodiments are not used for limiting the disclosure, any skilled person familiar with the patent can make some changes or modifications to obtain the equivalent embodiments of equivalent changes by using the technical contents mentioned above without departing from the scope of the technical solution of the disclosure, and for the content which is not separated from the technical solution of the disclosure, any simple modification, equivalent change and modification performed on the embodiment according to the technical essence of the disclosure still belong to the range of the solution of the disclosure.

The invention claimed is:

1. A laundry lifting device for a washing machine, comprising:
   a body, comprising a lifting shell being internally provided with an open cavity, and a lifting base body detachably mounted on an open end of the open cavity of the lifting shell to form an accommodating chamber;

a water inlet, arranged in the body and communicated with the accommodating chamber; and a centrifugal drainage assembly, arranged in the accommodating chamber, and configured to be arranged on an inner wall of an inner drum of a washing machine, wherein, the initial state of the centrifugal drainage assembly is a closed state, and the centrifugal drainage assembly is opened for drainage under the action of centrifugal force; and the centrifugal drainage assembly comprises a centrifugal piece comprising a connecting part and a balance weight part, a sealing plunger capable of doing reciprocating motion and an elastic piece used for elastically resetting the sealing plunger, a plunger base used for installing the sealing plunger is arranged on the lifting base body, the lifting base body is provided with a plunger hole used for allowing the sealing plunger to penetrate out of the accommodating chamber, a plunger channel is formed in the plunger base, and the sealing plunger is arranged in the plunger channel and capable of doing reciprocating motion and the elastic piece is kept limited in the plunger channel in the reciprocating motion of the sealing plunger, one end of the connecting part is connected with the balance weight part, another end of the connecting part is rotatably connected with the sealing plunger, and a middle of the connecting part is rotatably mounted on the plunger base to form a lever structure.

2. The laundry lifting device for the washing machine according to claim 1, wherein the plunger base comprises a hollow column penetrating through the plunger hole and a support arranged at one end, arranged outside the accommodating chamber, of the hollow column, and the plunger channel is through the hollow column.

3. The laundry lifting device for the washing machine according to claim 2, wherein the sealing plunger comprises a sealing column and a sealing plug arranged at one end of the sealing column, the elastic piece is a spring, one end of the spring abuts against an inner wall of the plunger channel, another end of the spring abuts against the sealing column, a certain interval is formed between a position, abutting against the spring, of the sealing column and the sealing plug, and the interval is larger than or equal to the displacement distance of the sealing plug moving from the closed state to the drainage state.

4. The laundry lifting device for the washing machine according to claim 3, wherein the sealing column comprises a guide part and an installation part located at one end of the guide part, the guide part is installed in the plunger channel and capable of doing the reciprocating motion, the sealing plug is installed on the installation part, the support is of an annular structure internally provided with a hollow channel communicating with the plunger channel, and a height of the installation part on a reciprocating motion path is larger than or equal to a height of the support on the reciprocating motion path.

5. The laundry lifting device for the washing machine according to claim 4, wherein the guide part is a first column body with cylindrical shape, the installation part is a second column body with cylindrical shape located at one end of the first column body, a diameter of the first column body is smaller than a diameter of the second column body, and the spring abuts against an end of the second column body.

6. The laundry lifting device for a washing machine according to claim 1, wherein, an elastic piece sheath is arranged on the elastic piece and wraps the elastic piece in a sealing mode.

7. The laundry lifting device for the washing machine according to claim 6, wherein:

the elastic piece and the elastic piece sheath are both arranged in the plunger channel.

8. The laundry lifting device for the washing machine according to claim 7, wherein the sealing plunger comprises a sealing column and a sealing plug arranged at one end of the sealing column, the elastic piece is a spring, one end of the spring abuts against an inner wall of the plunger channel, another end of the spring abuts against the sealing column, and the elastic piece sheath is an elastic threaded pipe; and the elastic threaded pipe is arranged in the plunger channel and arranged outside the spring to wrap the spring.

9. The laundry lifting device for the washing machine according to claim 6, wherein, one end of the elastic piece sheath is connected to a periphery of an outlet of the plunger channel in a sealing mode, and anther end of the elastic piece sheath is connected to a portion, being out of the plunger channel, of the sealing plunger in a sealing mode.

10. The laundry lifting device for the washing machine according to claim 9, wherein the sealing plunger comprises a sealing column and a sealing plug arranged at one end of the sealing column, the elastic piece is a spring, one end of the spring abuts against an inner wall of the plunger channel, another end of the spring abuts against the sealing column, and the elastic piece sheath is an elastic threaded pipe; and one end of the elastic threaded pipe is arranged on a periphery of an outlet of the plunger channel in a sealing mode, and another end of the elastic threaded pipe is arranged on the sealing plug in a sealing mode.

11. The laundry lifting device for the washing machine according to claim 1, wherein, the plunger base comprises a blocking body used for blocking the elastic piece in the reciprocating motion of the sealing plunger;

the body comprises:

a lifting shell, being internally provided with an open cavity; and a lifting base body, detachably installed at an open end of the open cavity of the lifting shell to form the accommodating chamber;

the plunger base is arranged on the lifting base body, the lifting base body is provided with a plunger hole used for allowing the sealing plunger to penetrate out of the accommodating chamber, a plunger channel is arranged in the plunger base, the sealing plunger is arranged in the plunger channel and capable of doing reciprocating motion, and the blocking body is an annular baffle arranged on a periphery of an outlet of the plunger channel.

12. The laundry lifting device for the washing machine according to claim 11, wherein the plunger base comprises a hollow column penetrating through the plunger hole and a support arranged at the end, arranged outside the accommodating chamber, of the hollow column, the plunger channel is through the hollow column, the support is of an annular structure internally provided with a hollow channel communicating with the plunger channel, and the annular baffle is arranged in the hollow channel of the support.

13. The laundry lifting device for the washing machine according to claim 12, wherein the sealing plunger comprises a sealing column and a sealing plug arranged at one end of the sealing column, the elastic piece is a spring, one end of the spring abuts against an inner wall of the plunger channel, and another end of the spring abuts against the sealing column/the sealing plug; and in a drainage state, the sealing plug is retracted into the annular baffle; and in a closed state, the sealing plug is extended out of the annular baffle, and the spring is blocked by the annular baffle.

14. The laundry lifting device for the washing machine according to claim 13, wherein the sealing column comprises a guide part and an installation part located at one end of the guide part, and the sealing plug is installed on the installation part;

the guide part is installed in the plunger channel and capable of doing the reciprocating motion, and an annular convex is arranged at an end, close to the guide part, of the installation part, one end of the spring abuts against an end of the annular convex, and the annular convex is kept in the annular baffle in a closed state.

15. The laundry lifting device for a washing machine according to claim 1, wherein the sealing plunger is provided with a sealing part, the plunger base is provided with a sleeve part, the sealing part is slidable arranged in the sleeve part in a sealing mode, and the elastic piece is arranged in a sleeve part in a sealing mode by the sealing part.

16. The laundry lifting device for the washing machine according to claim 15, wherein the sealing plunger comprises a sealing column and a sealing plug, the sealing column comprises a guide column section, the sealing part is a sealing column section arranged at one end of the guide column, and the sealing plug is arranged at an end of the sealing column section;

the sleeve part comprises a guide sleeve and a sealing sleeve, the guide part is arranged in the guide sleeve and capable of doing reciprocating motion, the sealing column is slidable arranged in the sealing sleeve in a sealing mode; the elastic piece is arranged in the guide sleeve, one end of the elastic piece abuts against the guide sleeve, and another end of the elastic piece abuts against the guide part or the sealing column.

17. The laundry lifting device for the washing machine according to claim 16, wherein the body comprises:

a lifting shell, internally provided with an open cavity; and a lifting base body, detachably installed at an open end of the open cavity of the lifting shell to form the accommodating chamber;

the plunger base is arranged on the lifting base body, the lifting base body is provided with a plunger hole used for allowing the sealing plunger to penetrate out of the accommodating chamber;

the sleeve part of the plunger base penetrates through the plunger hole; the plunger base further comprises a support which is arranged at one end, arranged outside the accommodating chamber, of the sleeve part;

the sealing sleeve is configured to extend out of the accommodating chamber, and a height of the sealing sleeve on the reciprocating motion path is smaller than or equal to a height of the support on the reciprocating motion path.

18. The laundry lifting device for the washing machine according to claim 16, wherein an installation column is arranged at the end of the sealing column, a limiting protruding ring is arranged on the installation column, the sealing plug is provided with a limiting groove with an opening, and the limiting protruding ring is installed in the limiting groove.

19. The laundry lifting device for the washing machine according to claim 1, wherein the connecting part is a connecting rod, the balance weight part is a balance weight block, the hollow column is provided with an extending part extending towards the balance weight part, and the middle of the connecting rod is rotatably connected with the extending part through a rotating shaft.

20. A drum washing machine with the laundry lifting device for the washing machine according to claim 1, comprising:

an inner drum; and an inner drum door, installed on an drum opening of the inner drum for opening/closing the drum opening; wherein when the inner drum door is closed, the inner drum door and the inner drum jointly form an independent washing chamber for accommodating washing water when laundry are washed; and a water outlet is formed in a sidewall of the inner drum, the lifting device is installed on the water outlet of the sidewall in the inner drum, and the centrifugal water drainage assembly blocks and closes the water outlet.

* * * * *